US012490003B2

(12) United States Patent
Miyanaka et al.

(10) Patent No.: US 12,490,003 B2
(45) Date of Patent: Dec. 2, 2025

(54) SOUND REPRODUCTION DEVICE

(71) Applicant: PANASONIC INTELLECTUAL PROPERTY MANAGEMENT CO., LTD., Osaka (JP)

(72) Inventors: Ryota Miyanaka, Osaka (JP); Hiroyuki Kano, Hyogo (JP); Kota Nakahashi, Osaka (JP); Daiki Cho, Osaka (JP); Yuki Odoriba, Osaka (JP); Kaname Tomita, Osaka (JP)

(73) Assignee: PANASONIC INTELLECTUAL PROPERTY MANAGMENT CO., LTD., Osaka (JP)

( * ) Notice: Subject to any disclaimer, the term of this patent is extended or adjusted under 35 U.S.C. 154(b) by 244 days.

(21) Appl. No.: 18/144,975

(22) Filed: May 9, 2023

(65) Prior Publication Data

US 2024/0080595 A1 Mar. 7, 2024

Related U.S. Application Data

(60) Provisional application No. 63/345,592, filed on May 25, 2022, provisional application No. 63/340,564, filed on May 11, 2022.

(51) Int. Cl.
*H04R 1/02* (2006.01)
*H04R 3/12* (2006.01)
*H04R 1/10* (2006.01)

(52) U.S. Cl.
CPC ............... *H04R 1/025* (2013.01); *H04R 3/12* (2013.01); *H04R 1/1083* (2013.01); *H04R 2499/13* (2013.01)

(58) Field of Classification Search
CPC .. H04R 2499/13; H04R 1/025; H04R 1/1083; H04R 3/12; G10K 11/17881; G10K 11/17879; G10K 2210/1281
(Continued)

(56) References Cited

U.S. PATENT DOCUMENTS 6,744,898 B1 6/2004 Hirano
7,418,103 B2 * 8/2008 Sargaison ........... H04M 1/6058 381/384
(Continued)

FOREIGN PATENT DOCUMENTS

FR 3 114 274 3/2022
JP 2007-121694 5/2007
(Continued)

OTHER PUBLICATIONS

Extended European search report issued Oct. 2, 2023 in corresponding European Patent Application No. 23172773.6.

*Primary Examiner* — Disler Paul
(74) *Attorney, Agent, or Firm* — Wenderoth, Lind & Ponack, L.L.P.

(57) ABSTRACT

A sound reproduction device is configured to store a head of a user and reproduce sound. The sound reproduction device includes: a headrest portion; a partition portion attached to the headrest portion so as to protrude forward relative to a front surface of the headrest portion; a speaker disposed in the partition portion; and a sound absorbing structure provided in at least a part of the inner surface of the partition portion excluding a region corresponding to an output surface of the speaker.

18 Claims, 26 Drawing Sheets

(58) Field of Classification Search
USPC .................................. 381/86, 71, 4.389, 302
See application file for complete search history.

(56) References Cited

U.S. PATENT DOCUMENTS

| | | | | |
|---|---|---|---|---|
| 9,683,884 | B2 * | 6/2017 | Cohen | H04S 1/00 |
| 9,981,613 | B2 * | 5/2018 | Ito | H04R 5/023 |
| 10,080,077 | B2 * | 9/2018 | Silvestri | G10K 11/162 |
| 10,237,648 | B2 * | 3/2019 | Takada | B60R 11/02 |
| 10,328,831 | B2 * | 6/2019 | Takada | H04R 1/025 |
| 10,672,377 | B2 * | 6/2020 | Griffin | G10K 11/17854 |
| 11,488,591 | B1 * | 11/2022 | Hart | H04R 3/12 |
| 11,765,506 | B2 * | 9/2023 | Robinson | H04R 1/403<br>381/86 |
| 11,893,972 | B2 * | 2/2024 | Seffernick | B60N 2/0022 |
| 12,057,099 | B1 * | 8/2024 | Shields | G10K 11/17879 |
| 12,250,517 | B2 * | 3/2025 | Fukui | H04R 1/403 |
| 2015/0117668 | A1 | 4/2015 | Niss | |
| 2020/0098347 | A1 * | 3/2020 | Kubota | G10K 11/17885 |
| 2021/0306788 | A1 | 9/2021 | Kim | |
| 2023/0139520 | A1 * | 5/2023 | Fukui | H04R 5/023<br>381/71.4 |

FOREIGN PATENT DOCUMENTS

| | | |
|---|---|---|
| JP | 2008-113118 | 5/2008 |
| JP | 2009-045302 | 3/2009 |

* cited by examiner

SOUND REPRODUCTION DEVICE

CROSS-REFERENCE TO RELATED APPLICATIONS

This application claims benefits of U.S. Provisional Application No. 63/340,564 filed May 11, 2022 and U.S. Provisional Application No. 63/345,592 filed May 25, 2022, the entire contents of which are hereby incorporated by reference.

TECHNICAL FIELD

The present disclosure relates to a sound reproduction device that reproduces sound.

BACKGROUND ART

As described in JP2007-121694A, JP2008-113118A, and JP2009-045302A, various sound reproduction devices such as headphones and speakers are proposed.

JP2007-121694A discloses a method for controlling reproduction in which: when the headphones are removed from ears or the like of a user during music reproduction on a mobile terminal device equipped with a music reproduction function, the music being reproduced is stopped; and when the headphones are put back on, the reproduction of the stopped music is restarted.

JP2008-113118A discloses an audio reproduction method in which: a head-related transfer function based on a positional relation with the head of a listener and/or movement of the head of the listener is read; and the head-related transfer function is used for virtual sound source processing.

JP2009-045302A discloses a speaker control device in which a direction of the speaker is adjusted based on a detection result of a position of a headrest of a seat body.

SUMMARY

In a case in which the sound reproduction device is used in an aircraft environment, a personal sound reproduction device such as headphones or earphones is usually selected. This is because use of a sound reproduction device such as a speaker causes sound leakage to surrounding seats. On the other hand, in a case in which earphones or headphones are used by a passenger on an aircraft or the like, there may be a heavy burden on the passenger for wearing the earphones or headphones for a long time.

The present disclosure is made in view of the above circumstance, and an object thereof is to provide a sound reproduction device capable of reproducing sound such as music in a noise environment such as an aircraft to enable the passenger to easily hear the sound while preventing the sound leakage to the surrounding seats without using kinds of sound reproduction devices such as headphones or earphones.

The present disclosure provides a sound reproduction device configured to store a head of a user and reproduce sound, the sound reproduction device including: a headrest portion including a front surface; a partition portion including an inner surface, the partition portion being attached to the headrest portion so as to protrude forward relative to the front surface of the headrest portion such that a storing space capable of storing the head of the user is defined by the inner surface and at least a part of the front surface of the headrest portion; at least one speaker including an output surface configured to allow sound to be output therefrom, the at least one speaker being disposed in the partition portion such that the output surface is directed toward the storing space; a sound absorbing structure provided in at least a part of the inner surface of the partition portion, the part of the inner surface of the partition portion excluding a region corresponding to the output surface of the at least one speaker; a processor; and a memory storing instructions that, when executed by the processor, cause the sound reproduction device to perform operations, the operations including: acquiring sound data; and generating a reproduced sound signal to be output to the at least one speaker based on the sound data.

According to the present disclosure, it is possible to reproduce sound such as music in a noise environment such as an aircraft to enable the passenger to easily hear the sound while preventing the sound leakage to the surrounding seats without using kinds of sound reproduction device such as headphones or earphones.

BRIEF DESCRIPTION OF DRAWINGS

The present disclosure will be described in detail based on the following figures, wherein.

DESCRIPTION OF EMBODIMENTS

Hereinafter, embodiments specifically disclosing a sound reproduction device according to the present disclosure will be described in detail with reference to the drawings as appropriate. However, more detailed description than necessary may be omitted. For example, detailed description of well-known matters and redundant description of substantially the same configuration may be omitted. This is to avoid the following description from being unnecessarily redundant and facilitate understanding of those skilled in the art. The accompanying drawings and the following description are provided for those skilled in the art to fully understand the present disclosure, and are not intended to limit the subject matters described in the claims.

First to eleventh embodiments provide a sound reproduction device that forms a sound field space in which a user (for example, a passenger) can enjoy sound of a content such as a movie without wearing headphones or earphones in an environment where predetermined noise occurs, such as an aircraft. In the following, examples in which the sound reproduction device is mounted on an aircraft will be described.

First Embodiment

Figure 1:
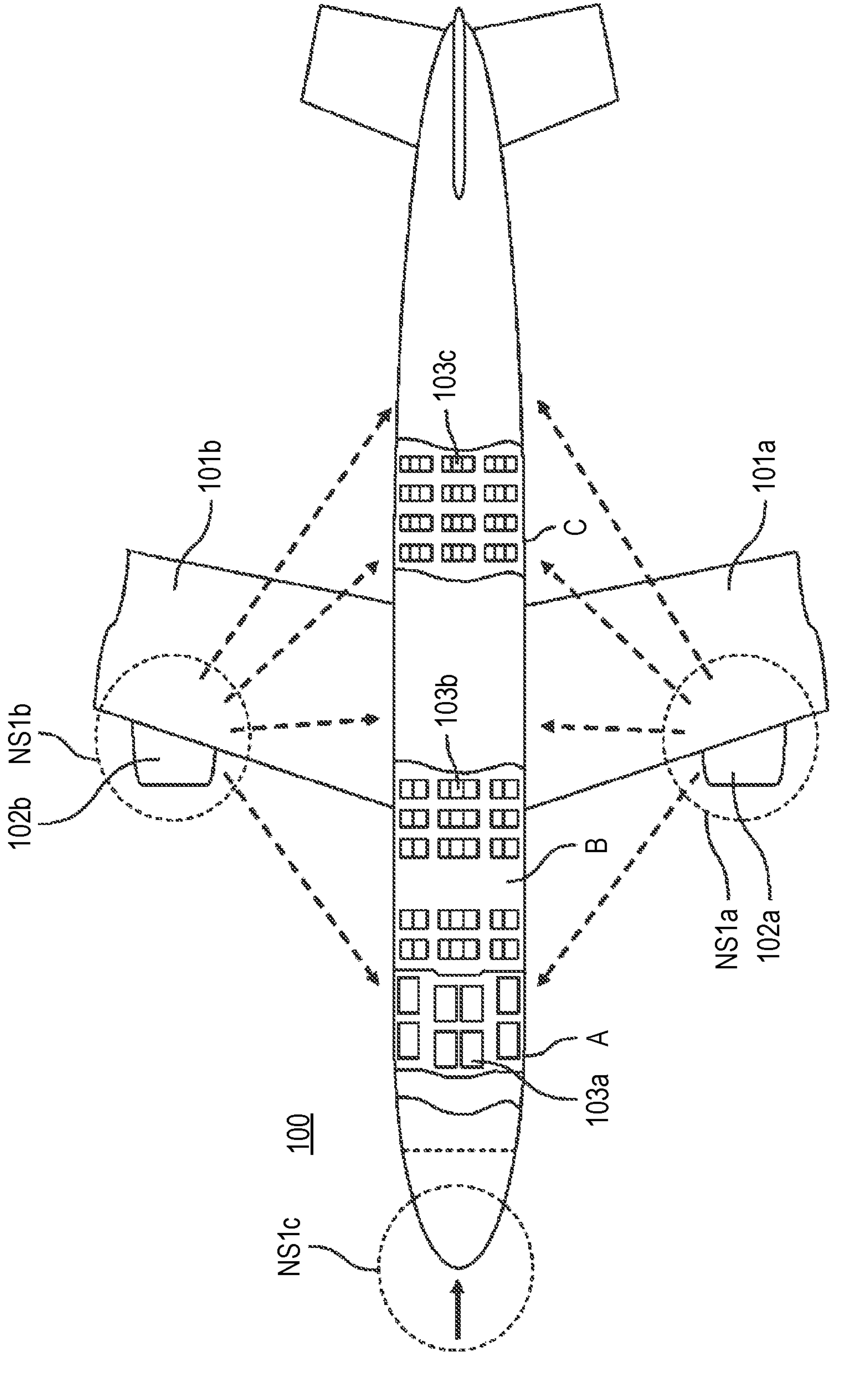
FIG. 1 schematically shows a source of aircraft noise generated in an aircraft in which a sound reproduction device according to a first embodiment is installed.

First, an aircraft noise environment will be described with reference to FIG. 1. As shown in FIG. 1, an aircraft 100 includes at least an aircraft body, left and right wings 101*a* and 101*b* projecting from the aircraft body, and engines 102*a* and 102*b* mounted on the wings 101*a* and 101*b*, respectively. Considering a sound environment in a space inside the aircraft 100, sound emitted from the engines 102*a* and 102*b* is a big noise source since it involves not only rotating sound of propellers (not shown) built in the engines 102*a* and 102*b*, but also reverberation of an airflow during flight.

The engines 102*a* and 102*b* act as external noise sources NS1*a* and NS1*b* for, for example, seat rows 103*a*, 103*b*, and 103*c* in a cabin A (for example, first class), a cabin B (for example, business class), and a cabin C (for example, economy class) on the aircraft. Collision sound (wind noise) between each of a tip portion, a side surface portion, and wings 101*a* and 101*b* of the aircraft body and the airflow accompanying the aircraft body moving at a high speed in an upper air layer acts as a noise source NS1*c*. Aircraft noise is generated by mixing these noises.

When a content such as a movie is reproduced from a speaker, so-called sound leakage occurs by exceeding the surrounding noise for each frequency band, but since the content reproduced sound has the highest sound pressure at an output point and attenuates with distance, by appropriately controlling frequencies of an ambient environment and the reproduced sound, it is possible to form an acoustic environment where the user can hear the reproduced sound at his or her own seat and only noise can be heard at other adjacent seats (no sound leakage).

Next, a sound reproduction device 200 according to a first embodiment will be described with reference to FIGS. 2A to 8.

Figure 2B:
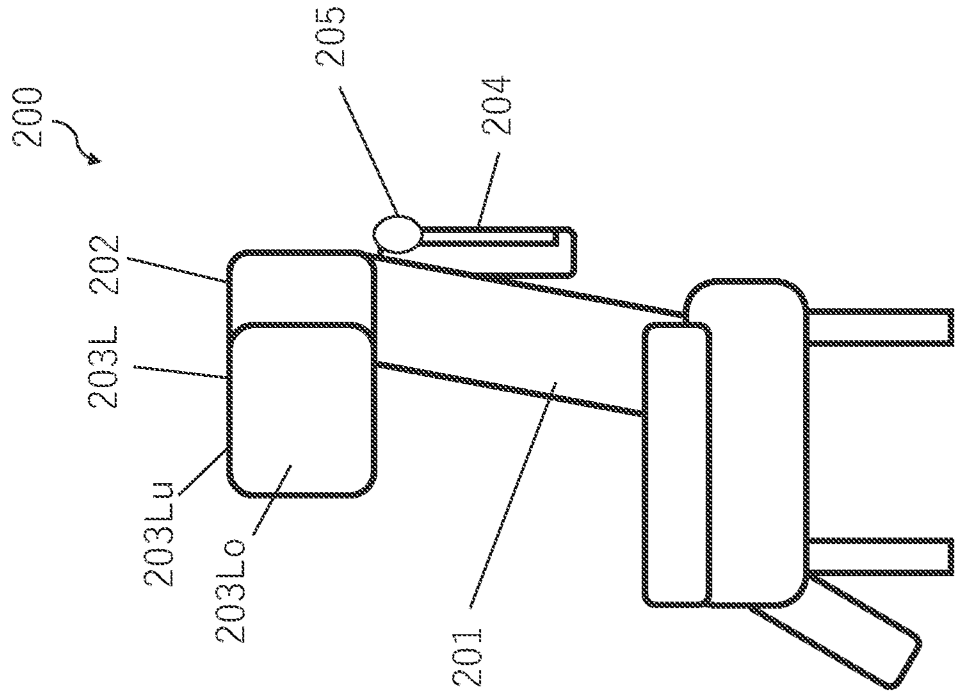
FIG. 2B is a left side view of the aircraft seat on which the sound reproduction device according to the first embodiment is mounted.
Figure 2A:
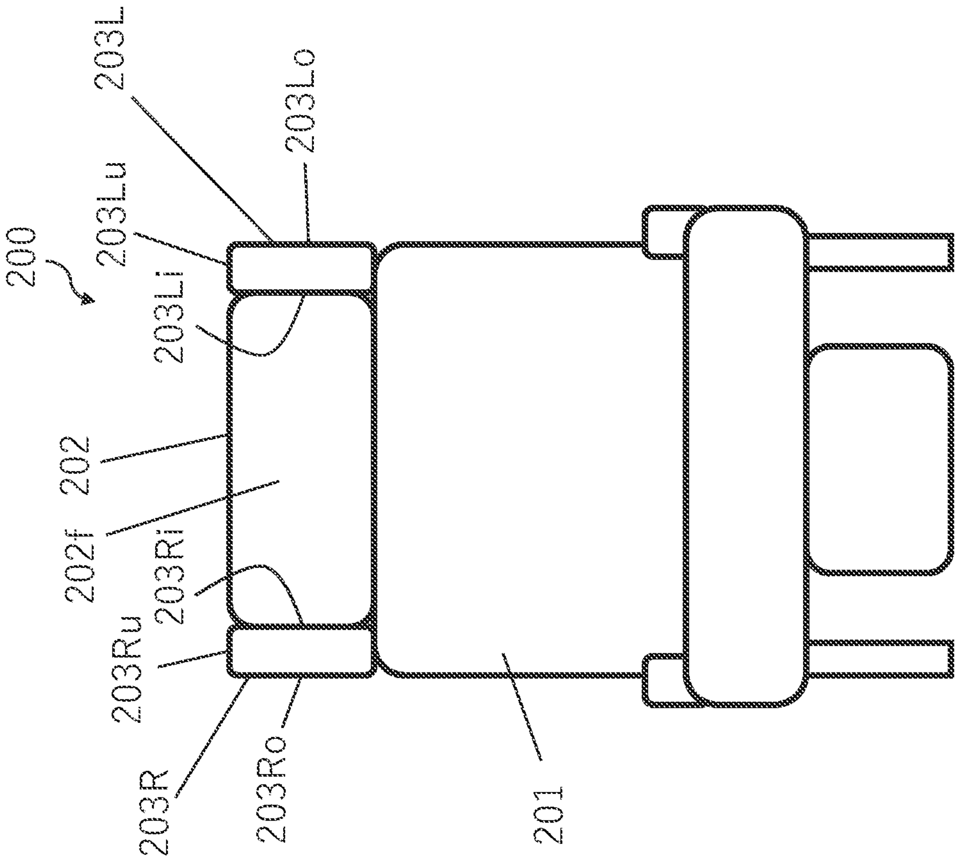
FIG. 2A is a front view of an aircraft seat on which the sound reproduction device according to the first embodiment is mounted.

As shown in FIGS. 2A and 2B, an aircraft seat 201 is provided with a headrest portion 202, a pair of left and right partition portions 203L and 203R, and an information display device 204.

The headrest portion 202 is provided on an upper portion of the aircraft seat 201 and includes a front surface 202*f*.

Figure 3:
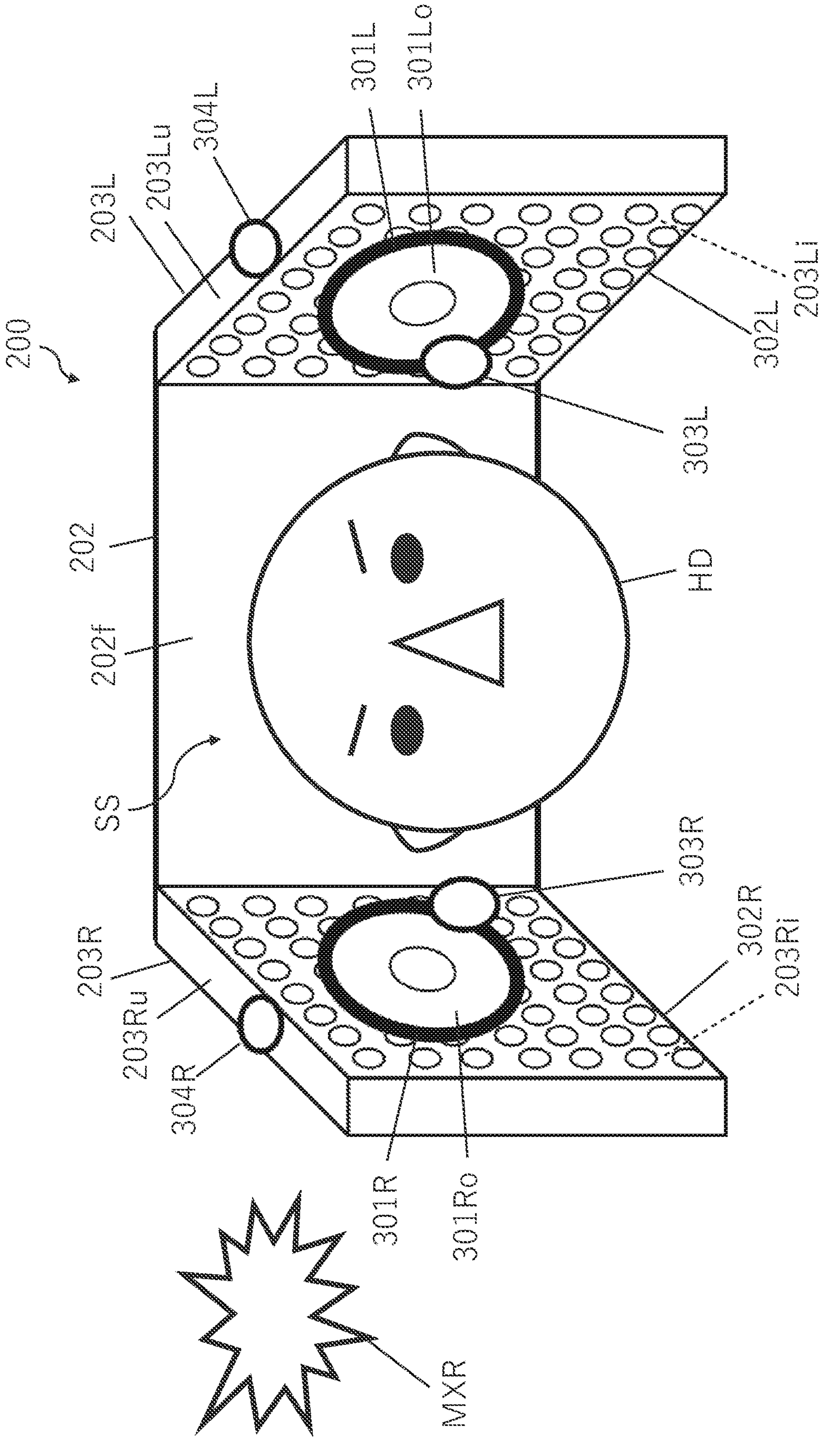
FIG. 3 is a front view of a headrest portion and a surrounding thereof of the sound reproduction device according to the first embodiment, and a passenger.

Each of the partition portions 203L and 203R is attached to headrest portion 202 so as to protrude forward relative to the front surface 202*f* of the headrest portion 202. The partition portion 203L includes an inner surface 203Li, an outer surface 203Lo and an upper surface 203Lu, and the partition portion 203R includes an inner surface 203Ri, an outer surface 203Ro and an upper surface 203Ru. As shown in FIG. 3, at least a part of the front surface 202*f* of the headrest portion 202, the inner surface 203Li of the partition portion 203L, and the inner surface 203Ri of the partition portion 203R define a storing space SS capable of storing a head HD of the passenger.

The information display device 204 includes a camera 205, is mounted on a rear side of the aircraft seat 201, and is configured to reproduce the content.

Figure 5:
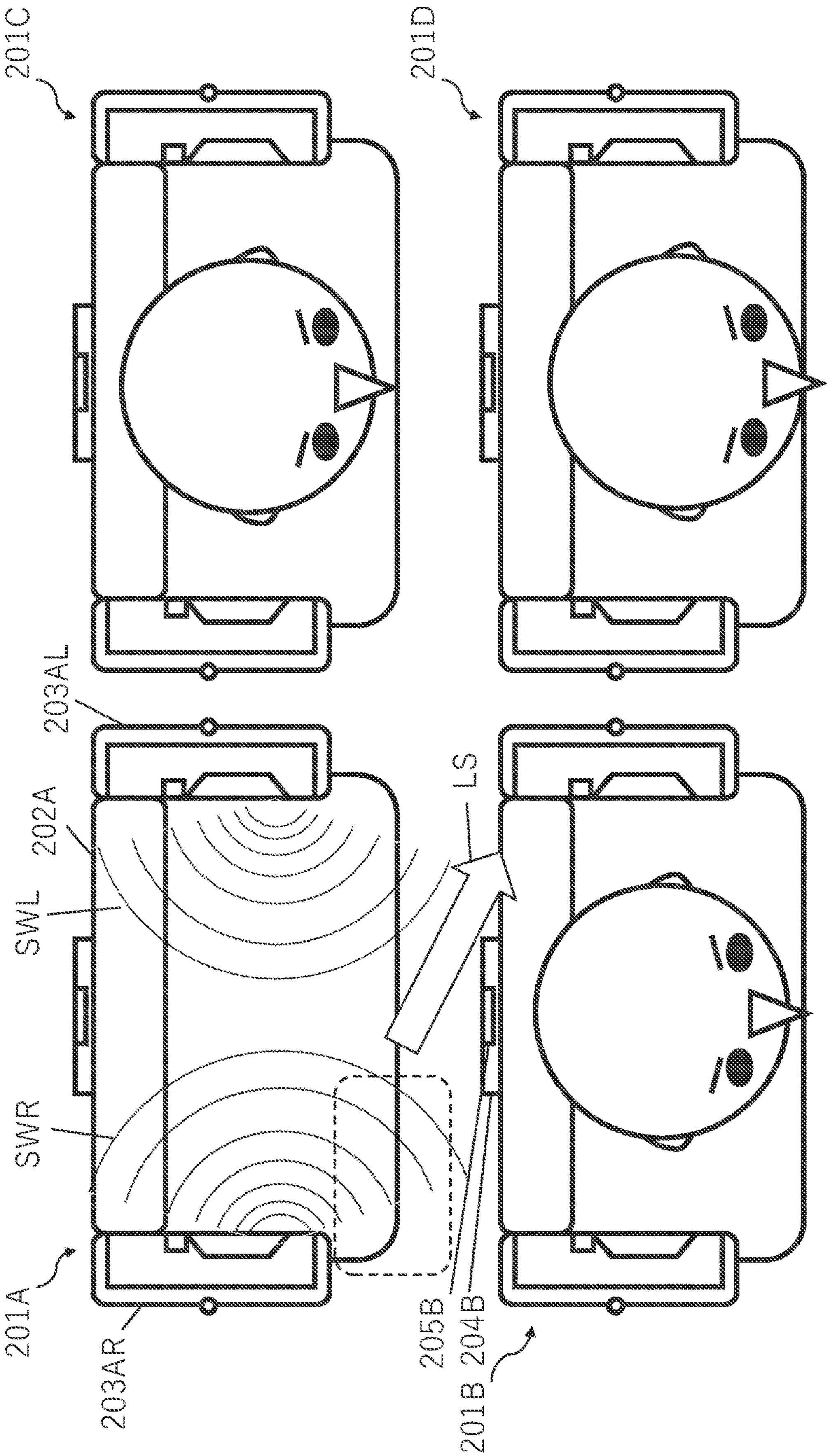
FIG. 5 is a top view of a plurality of seats installed the aircraft.

The sound reproduction device 201 includes the headrest portion 202 (for example, a headrest portion 202A shown in FIG. 5) of a target seat (for example, an aircraft seat 201A shown in FIG. 5), the partition portions 203L and 203R (for example, partition portions 203AL and 203AR shown in FIG. 5), and the information display device 204 provided on a seat (for example, an aircraft seat 201B shown in FIG. 5) in front of the target seat and including the camera 205 (for example, an information display device 204B including a camera 205B shown in FIG. 5), and is configured to reproduce sound. As a result, the passenger can control content reproduction using the information display device 204 provided on the seat in front of the target seat.

Note that the partition portion is not limited to including the pair of left and right partition portions 203L and 203R, and may be configured as one partition portion so as to cover left and right sides of the storing space SS and at least a part of an upper portion of the storing space SS. The partition portions 203L and 203R may be structured integrally with the headrest portion 202. Although an example in which the camera 205 is mounted on the information display device 204 is shown, the camera 205 is not necessarily mounted on the information display device 204.

As shown in FIG. 3, the sound reproduction device 200 further includes speakers 301L and 301R, sound absorbing structures 302L and 302R, head detection sensors 303L and 303R, and microphones 304L and 304R.

The speaker 301L includes an output surface 301Lo from which sound is output, and is attached to the partition portion 203L with the output surface 301Lo facing the storing space SS. Similarly, the speaker 301R includes an output surface 301Ro from which sound is output, and is attached to the partition portion 203R with the output surface 301Ro facing the storing space SS.

The sound absorbing structure 302L is provided to surround the speaker 301L. Similarly, the sound absorbing structure 302R is provided to surround the speaker 301R. The sound absorbing structures 302L and 302R may be provided on at least a part of the inner surfaces 203Li and 203Ri of the partition portions 203L and 203R, excluding regions corresponding to the output surfaces 301Lo and 301Ro of the speakers 301L and 301R. The headrest portion 202 is for the passenger to rest his or her head on, and the headrest portion 202 may be additionally provided with a sound absorbing structure. For the sound absorbing structures 302L and 302R, a sound absorbing material that converts sound into heat, a porous Helmholtz resonance structure that prevents reflection using a resonance structure, or the like is used.

The head detection sensor 303L is disposed near the speaker 301L and configured to detect presence or absence of the head HD of the passenger near the speaker 301L. For example, by providing the head detection sensor 303L between the output surface 301Lo of the speaker 301L and the headrest portion 202, detection accuracy of the head HD of the passenger sitting on the aircraft seat 201 can be improved. Similarly, the head detection sensor 303R is disposed near the speaker 301R and configured to detect presence or absence of the head HD of the passenger near the speaker 301R. For example, by providing the head detection sensor 303R between the output surface 301Ro of the speaker 301R and the headrest portion 202, the detection accuracy of the head HD of the passenger sitting on the aircraft seat 201 can be improved. Each of the head detection sensors 303L and 303R includes, for example, an infrared sensor, a proximity sensor, an electrostatic sensor, or the like.

The microphone 304L is provided on the upper surface 203Lu of the partition portion 203L, and is configured to collect environmental sound, which is sound around the microphone 304L, such as noise from the aircraft 100 and sound from the speakers 301L and 301R. Similarly, the microphone 304R is provided on the upper surface 203Ru of the partition portion 203R, and is configured to collect environmental sound, which is sound around the microphone 305L, such as the noise from the aircraft 100 and the sound from the speakers 301L and 301R. Note that the positions where the microphones 305L and 305R are provided are not limited to the upper surfaces 203Lu and 203Ru of the partition portions 203L and 203R, and may be disposed on the outer surfaces 203Lo and 203Ro or a portion where there is no obstacle.

Figure 4:
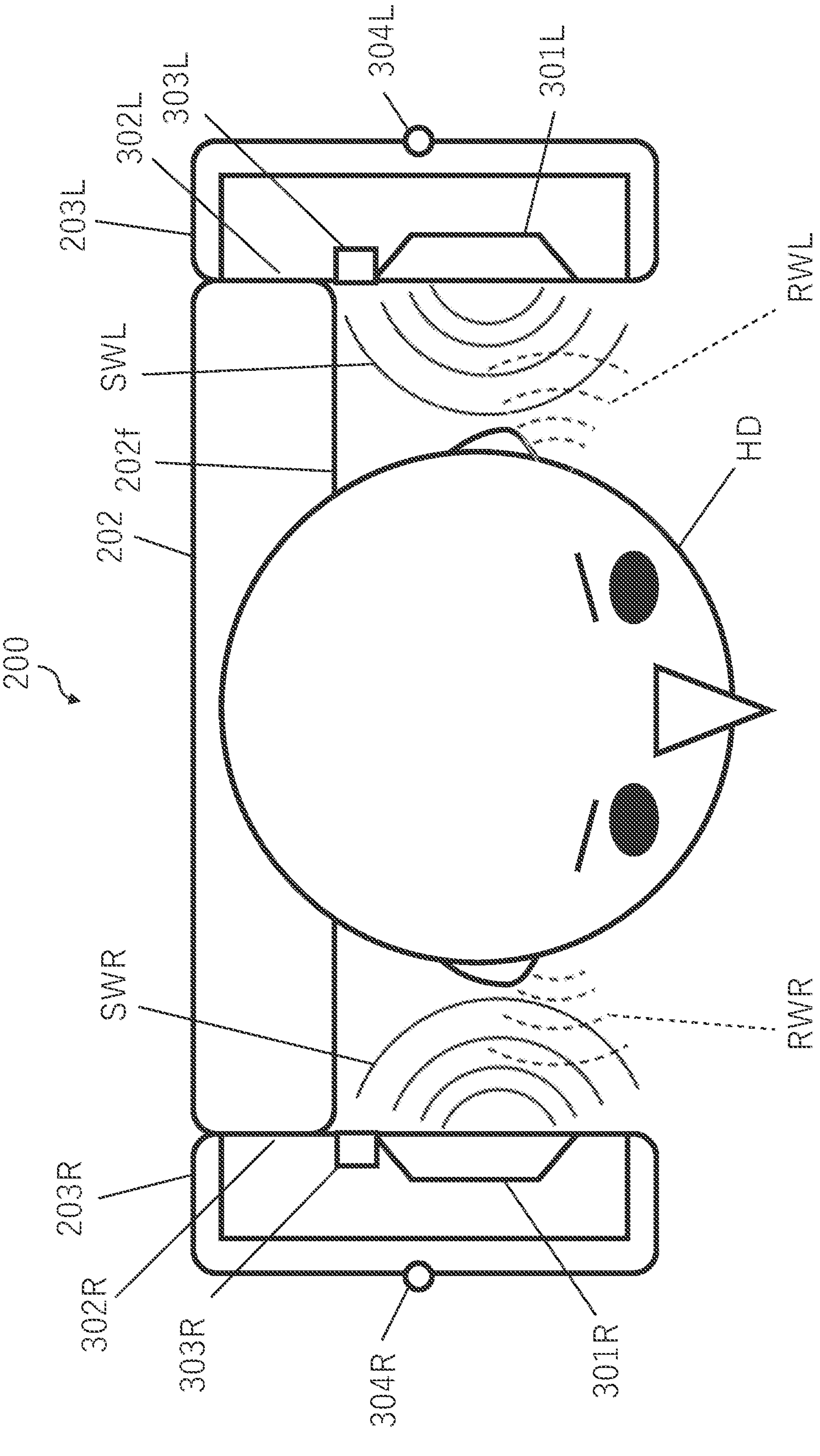
FIG. 4 is a top view of the headrest portion and the surrounding thereof of the sound reproduction device according to the first embodiment, and the passenger.

A principle of suppressing sound leakage will be described with reference to FIGS. 4 and 5. As shown in FIG. 4, reproduced sound wave surfaces SWL and SWR of the content reproduced sound spread in all directions and reach ears of the passenger, so that the passenger can hear the content reproduced sound. By arranging the speakers 301L and 301R in the partition portions 203L and 203R so that the head HD of the passenger is close, the reproduced sound wave surfaces SWL and SWR reach the head HD of the passenger and reflect without widening. Reflected wave surfaces RWL and RWR of the reproduced sound also propagate while spreading in all directions, but the reflection is prevented and the sound is absorbed by the sound absorbing structures 302L and 302R disposed around the speakers 301L and 301R. In this way, by disposing the sound absorbing structures 302L and 302R around the speakers 301L and 301R, it is possible to absorb the reproduced sound and the reflected sound of the reproduced sound without spreading the reproduced sound and the reflected sound of the reproduced sound. By disposing the speakers 301L and 301R near the head HD of the passenger, it is possible to lower the reproduced sound pressure while increasing a sound pressure experienced by the passenger, thereby further suppressing the sound leakage.

The microphones 304L and 304R are disposed near a boundary between a reproduction area of the passenger and an area where sound leakage is desired to be prevented. The sound leakage can be suppressed by controlling characteristics of a reproduced sound signal of the content based on characteristics of an environmental sound signal representing the environmental sound collected by the microphones 304L and 304R. By reproducing sound such as white noise for identifying transfer characteristics from the speakers 301L and 301R and detecting the sound with the microphones 304L and 304R, transfer characteristics between the speaker 301L and the microphone 304 and transfer characteristics between the speaker 301R and the microphone 304R can be measured in advance. From these transfer characteristics and the reproduced sound signal of the content, it is possible to calculate what kind of characteristics the sound changes at the positions of the microphones 304L and 304R when the content sound is reproduced from the speakers 301L and 301R, so as to obtain characteristics of a calculated reproduced sound signal. A noise sound signal representing the aircraft noise is obtained based on the calculated reproduced sound signal and the environmental sound signal, and by comparing the calculated reproduced sound signal with the environmental sound signal, it is possible to estimate the sound leaking from the storing space SS detected at the positions of the microphones 304L and 304R, so as to obtain an estimated sound signal. The sound leakage can be prevented by performing filtering on frequency bands in which the sound leaks from the storing space SS based on the characteristics of the estimated sound signal, so as to prevent the estimated sound.

As shown in FIG. 5, in the target seat 201A, when the head of the passenger is not near the partition portion 203 (the passenger leaves the seat while the content is being reproduced), no reflection occurs at the head of the passenger, and the absorption by the sound absorbing structures 302L and 302R is limited, so that the reproduced sound wave surfaces SWL and SWR spread in all directions, and the sound leakage occurs. Since this leaking sound LS spreads to front seats 201B and 201D and the adjacent seat 201C of the target seat 201A at a large level without being absorbed, this leaking sound LS is heard by passengers in the adjacent seat 201C and the front seats 201B and 201D, which makes the passengers uncomfortable. In order to prevent this sound leakage, when the head detection sensors 303L and 303R do not detect the head of the passenger for a certain period of time or more (for example, 5 seconds or longer), the information display device 204B generates a notification indicating this state and the reproduction of the content is paused. As a result, it is possible to prevent the generation of the leaking sound LS when the user leaves the seat. Note that by configuring the sound reproduction device 200 to use the camera 205B mounted on the information display device 204B on a back surface of the front seat 201B to detect the head of the passenger, the head detection sensors 303L and 303R may be omitted. A pressure sensor may be disposed in the headrest portion 202 to detect the head of the passenger. Since the passenger may temporarily move his or her head while seated during eating or the like, the reproduction may be paused when the head detection sensor 303 does not detect the head for a certain period of time.

Figure 6:
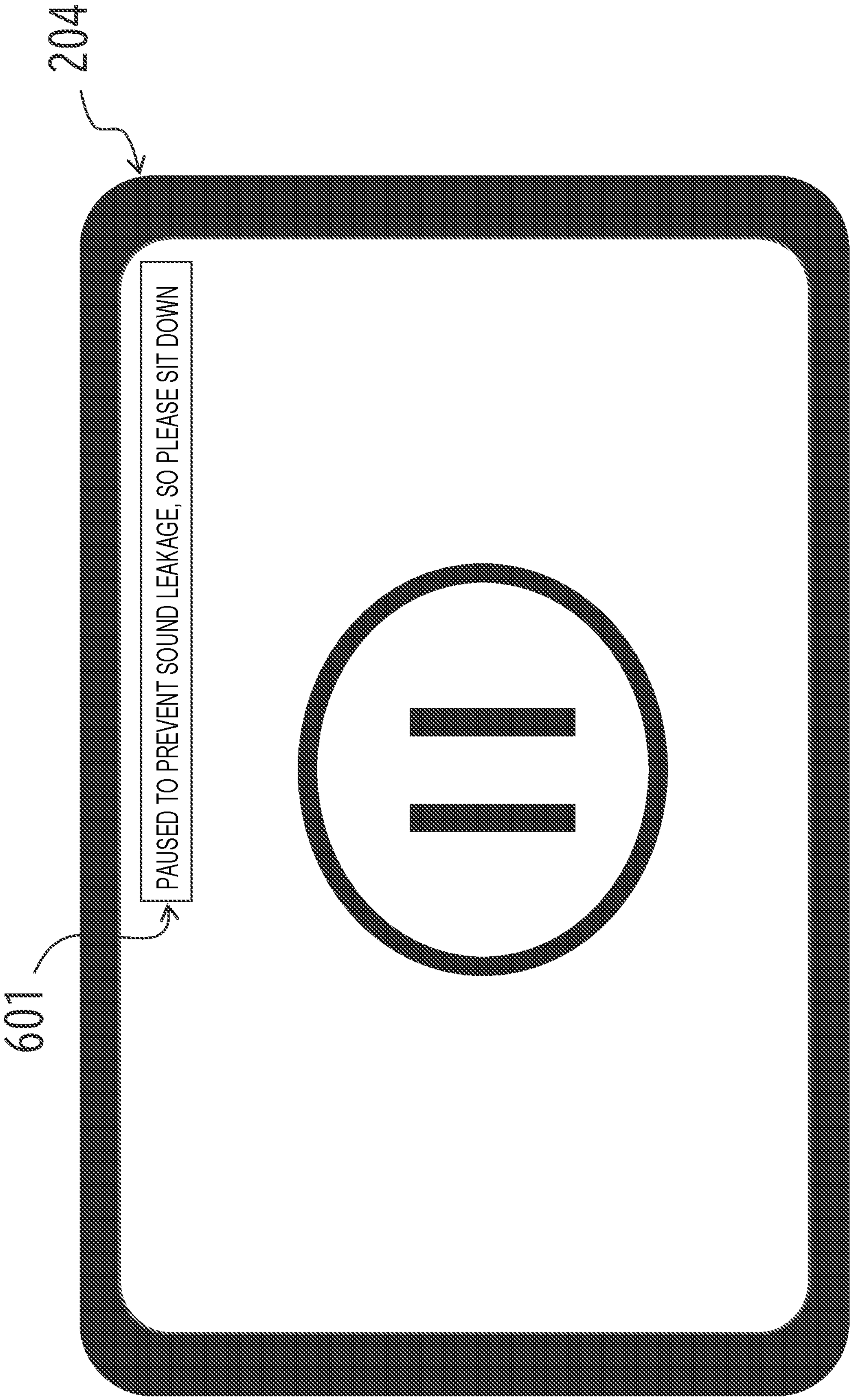
FIG. 6 is a diagram showing a display example of a monitor when the passenger leaves the seat during reproduction of sound from a speaker.

When the passenger leaves the seat, the sound reproduction device 200 automatically pauses the reproduction to prevent the sound leakage, and at this time, a message 601 shown in FIG. 6 is displayed on the information display device 204 to notify the passenger that the reproduction is paused. When it is determined that the passenger is seated, that is, the head HD of the passenger is changed from a state of being absent to a state of being present in the storing space SS, the sound reproduction device 200 may automatically restart the reproduction in response to detection of seating of the passenger by the head detection sensors 303L and 303R, or may restart the reproduction by an operation of the passenger.

Figure 7:
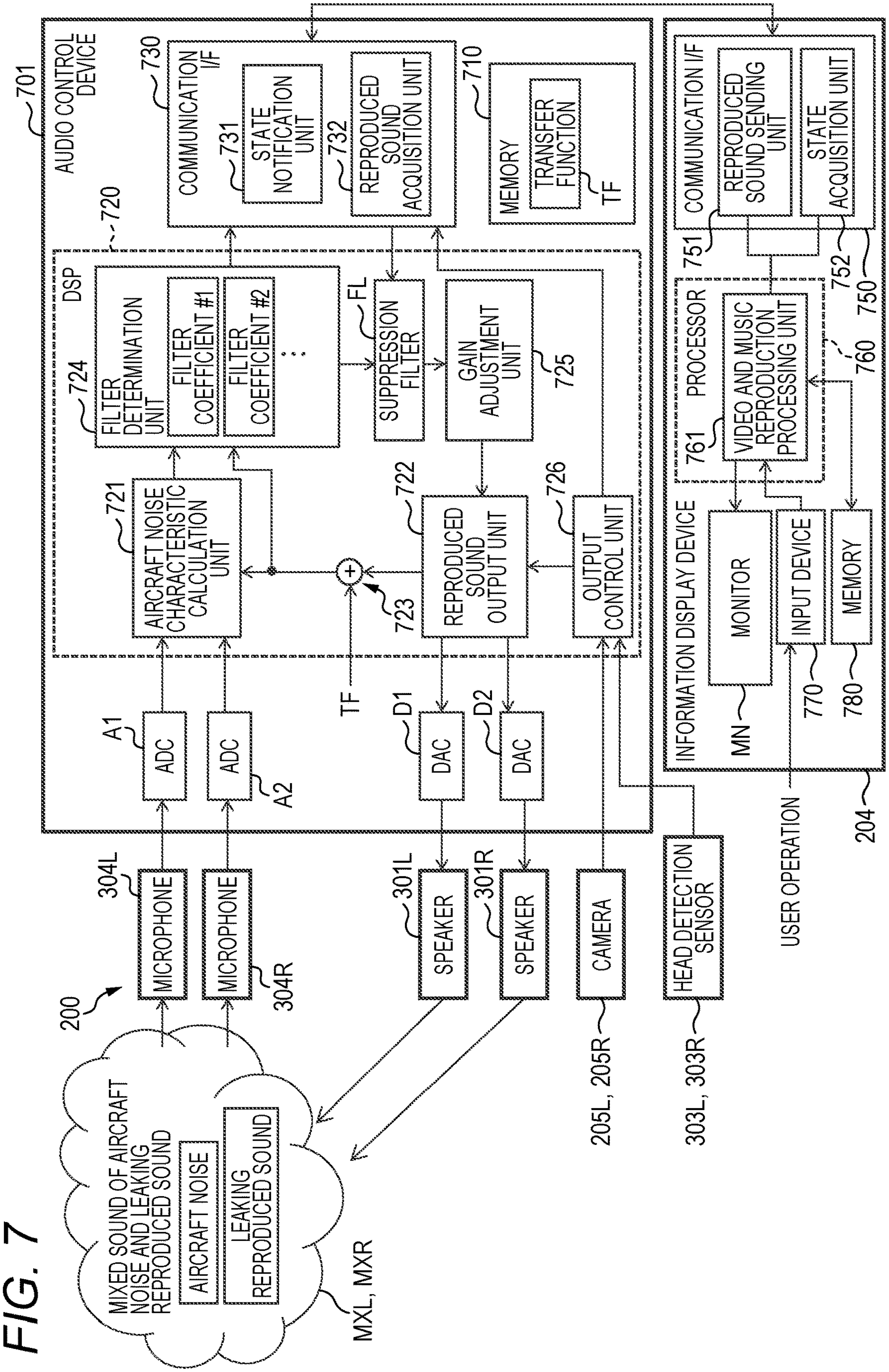
FIG. 7 is a diagram showing an internal configuration example of the sound reproduction device according to the first embodiment.

FIG. 7 is a diagram showing an internal configuration example of the sound reproduction device 200 according to the first embodiment. The sound reproduction device 200 further includes an audio control device 701. Note that the audio control device 701 may be included in and integrated with the information display device 204.

The microphones 304L and 304R and the audio control device 701, the speakers 301L and 301R and the audio control device 701, the cameras 205L and 205R and the audio control device 701, the head detection sensors 303L and 303R and the audio control device 701, and the audio control device 701 and the information display device 204 are connected to each other so as to allow input and output of data signals. Since the microphones 304L and 304R have the same configuration, the microphone 304L will be described as an example. Similarly, since the speakers 301L and 301R have the same configuration, the speaker 301L will be described as an example. Furthermore, in the sound reproduction device 200, the number of microphones and speakers may be one, or three or more, but in order to make the description easier to understand, an example in which one on each side in a left-right direction as viewed from the passenger will be described.

The microphone 304L collects the environmental sound around the partition portion 203L. Here, the environmental sound is assumed to be, for example, a mixed sound MXL of the aircraft noise and leaking reproduced sound output from each of the speakers 301L and 301R and exceeding the storing space SS. A data signal of the environmental sound collected by the microphone 304L is input to the audio control device 701. Hereinafter, the data signal of the environmental sound output from the microphone 304L will be referred to as an "environmental sound signal".

The speaker 301L acoustically outputs a data signal of the content reproduced sound that is suppressed by the audio control device 701 so that the sound does not leak out of the storing space SS. Hereinafter, the data signal of the content reproduced sound will be referred to as "reproduced sound signal", and the reproduced sound signal acoustically output from each of the speakers 301L and 301R will be referred to as "content reproduced sound".

The audio control device 701 includes analog-to-digital converters (ADC) A1 and A2, a memory 710, digital-to-analog converters (DAC) D1 and D2, a digital signal processor (DSP) 720, and a communication interface (FF) 730. Since ADC A1 and A2 have the same configuration, ADC A1 will be described as an example, and the description of ADC A1 can also be applied to ADC A2 by replacing A1 with A2. Similarly, since DAC D1 and D2 have the same configuration, DAC D1 will be described as an example, and the description of DAC D1 can also be applied to DAC D2 by replacing D1 with D2.

ADC A1 receives and AD-converts an environmental sound signal of analog environmental sound (for example, mixed sound MXL) collected by the microphone 304L, and sends the environmental sound signal of digital environmental sound (for example, mixed sound MXL) to the DSP 720.

The memory 710 includes at least a random access memory (RAM) and a read only memory (ROM) for example. RAM functions as a work memory for the DSP 720 and temporarily stores data signals generated or acquired by the DSP 720. ROM stores programs or instructions and control data necessary for executing various kinds of processing performed by the DSP 720. Note that in addition to RAM and ROM, the memory 710 may include a storage medium such as a flash memory, a hard disk drive (HDD), or a solid state drive (SSD).

The memory 710 also stores a transfer function TF that expresses in a frequency domain the transfer characteristics that indicate how sound propagates and changes (for example, attenuates) between each microphone and each speaker. This transfer function TF is artificially measured in advance for each combination of the microphones 304L, 304R and the speakers 301L, 301R. Specifically, the transfer function TF includes characteristic data indicating the transfer function of the sound signal between the microphone 304L and the speaker 301L, characteristic data indicating the transfer function of the sound signal between the microphone 304L and the speaker 301R, characteristic data indicating the transfer function of the sound signal between the microphone 304R and the speaker 301L, and characteristic data indicating the transfer function of the sound signal between the microphone 304R and the speaker 301R. In this way, the number of pieces of the characteristic data that the transfer function TF has is determined based on the combination of the number of microphones and speakers.

The DAC D1 receives and DA-converts the digital reproduced sound signal that is suppressed by the DSP 720 so as not to cause sound leakage outside the storing space SS, and sends the analog reproduced sound signal to the speaker 301L.

The DSP 720 functions as a controller that controls the overall operation of the audio control device 701, and performs control processing for supervising operation of each unit of the audio control device 701, data input and output processing to and from each unit of the audio control device 701, and data arithmetic processing and data storage processing. Note that instead of the DSP 720, a processor such as a central processing unit (CPU) or a field programmable gate array (FPGA) may be used. The DSP 720 operates in accordance with the programs or instructions and the control data stored in the memory 710. The DSP 720 uses the memory 710 during operation, and the data signals generated or acquired by the DSP 720 are temporarily stored in the memory 710. The DSP 720 functionally or physically includes an aircraft noise characteristic calculation unit 721, a reproduced sound output unit 722, a calculator 723, a filter determination unit 724, a suppression filter FL, a gain adjustment unit 725, and an output control unit 726.

The aircraft noise characteristic calculation unit 721 calculates frequency characteristics of the noise sound signal indicating the aircraft noise included in the mixed sound MXL by removing the calculated reproduced sound signal calculated as the content reproduced sound at the microphone position output from the calculator 723 from the environmental sound signal of the environmental sound (for example, the mixed sound MXL) output from the ADC A1 and A2, and sends the frequency characteristics to the filter determination unit 724.

The reproduced sound output unit 722 outputs the reproduced sound signal suppressed by the suppression filter FL, or the reproduced sound signal suppressed by the suppression filter FL and gain-adjusted by the gain adjustment unit 725 to the calculator 723 and DAC D1 and D2.

The calculator 723 calculates the frequency characteristics of the calculated reproduced sound signal indicating the reproduced sound signal of the content reproduced sound from each of the speakers 301L and 301R at the respective microphone positions of the microphones 304L and 304R by convolving the characteristic data of the transfer function TF read from the memory 710 with the reproduced sound signal from the reproduced sound output unit 722. The output of the calculator 723 is input to each of the aircraft noise characteristic calculation unit 721 and the filter determination unit 724.

The filter determination unit 724 determines whether to update a filter coefficient of the suppression filter FL based on the frequency characteristics of the noise sound signal of the aircraft noise from the aircraft noise characteristic calculation unit 721 and the frequency characteristics of the calculated reproduced sound signal of the content reproduced sound at the microphone position acquired from the calculator 723. That is, the filter determination unit 724 estimates the leaking sound using a comparison result between the frequency characteristics of the noise sound signal of the aircraft noise and the frequency characteristics of the calculated reproduced sound signal of the content reproduced sound at the microphone position, so as to acquire an estimated sound signal, and determines whether to update or maintain the filter coefficient of the suppression filter FL based on the frequency characteristics of the estimated sound signal. Specifically, in order to make a sound pressure level of the calculated reproduced sound signal of the content reproduced sound at the microphone position not exceed a sound pressure level of the noise sound signal of the aircraft noise in, for example, each sub-frequency band obtained by dividing an operation frequency band into a plurality of equal parts, the filter determination unit 724 updates the filter coefficient of the suppression filter that can suppress the corresponding sub-frequency band.

The suppression filter FL may be, for example, a combination of general acoustic processing filters such as a low-shelf filter, a high-shelf filter, and a notch filter. In the present embodiment, the suppression filter FL is, for example, a finite impulse response (FIR) filter that includes multi-stage taps and can freely set a filter coefficient of each tap. Updating of the filter coefficients #1, #2, . . . is performed by a predetermined algorithm (for example, least mean square (LMS)). The filter determination unit 724 may send to the communication OF 730 an instruction to send a notification indicating that the sound pressure level of the content reproduced sound is suppressed by the suppression filter FL.

The suppression filter FL is a suppression filter whose filter coefficient is updated or maintained by the filter determination unit 724. The suppression filter FL suppresses the reproduced sound signal acquired from the communication OF 730 in the corresponding frequency band using the output of the filter determination unit 724 and sends the suppressed reproduced sound signal to the gain adjustment unit 725.

The gain adjustment unit 725 adjusts a gain of the reproduced sound signal suppressed by the suppression filter FL, and sends the gain-adjusted reproduced sound signal to the reproduced sound output unit 722. This gain adjustment by the gain adjustment unit 725 may be omitted.

The output control unit 726 acquires detection signals from the cameras 205L and 205R and the head detection sensors 303L and 303R, and controls the reproduced sound signal output from the reproduced sound output unit 722 based on the detection signals. Specifically, the output control unit 726 determines whether there is a head of a passenger in the storing space SS based on the detection signals, and controls the reproduced sound signal based on a determination result. For example, the output control unit 726 may stop outputting the reproduced sound signal when it is determined that the head of the passenger is not present in the storing space SS, or may stop outputting the reproduced sound signal when it is determined that the head of the passenger is not present in the storing space SS for a predetermined period of time. The output control unit 726 may send to the communication FF 730 an instruction to send a notification indicating that the output of the content reproduced sound is stopped.

The communication FF 730 is a communication circuit that sends and receives data signals between the audio control device 701 and the information display device 204, and functionally includes a state notification unit 731 and a reproduced sound acquisition unit 732.

The state notification unit 731 receives an instruction to send a notification indicating a state where the sound pressure level of the content reproduced sound is suppressed or a notification indicating a state where the output of the content reproduced sound is stopped (see a message 601 in FIG. 6, for example) from the filter determination unit 724 and the output control unit 726 and sends the instruction to the information display device 204.

The reproduced sound acquisition unit 732 receives from the information display device 204 the reproduced sound signal of the content reproduced sound to be output through the speakers 301L and 301R from the information display device 204 as a sound source, and sends the reproduced sound signal to the DSP 720. This reproduced sound signal is input to the suppression filter FL.

The information display device 204 includes a communication FF 750, a processor 760, an input device 770, a memory 780, and a monitor MN.

The communication FF 750 is a communication circuit that sends and receives data signals between the information display device 204 and the audio control device 701 and functionally includes a reproduced sound sending unit 751 and a state acquisition unit 752.

The reproduced sound sending unit 751 sends to the audio control device 701 the data signal (reproduced sound signal) of the content reproduced sound for each content read from the memory 780 by the processor 760 based on a user operation on the input device 770.

The state acquisition unit 752 receives an instruction to send a notification indicating a state where the sound pressure level of the content reproduced sound is suppressed or a notification indicating a state where the output of the content reproduced sound is stopped (see the message 601 in FIG. 6, for example) from the audio control device 701 and sends the instruction to the processor 760.

The processor 760 functions as a controller that controls the overall operation of the information display device 204, and performs control processing for supervising operation of each unit of the information display device 204, data input and output processing to and from each unit of the information display device 204, and data arithmetic processing and data storage processing. The processor 760 operates in accordance with the programs or instructions and the control data stored in the memory 780. The processor 760 uses the memory 780 during operation, and the data signals generated or acquired by the processor 760 are temporarily stored in the memory 780. The processor 760 functionally includes a video and music reproduction processing unit 761.

The video and music reproduction processing unit 761 outputs (reproduces) a video data signal of a content selected based on the user operation on the input device 770 to the monitor MN, or sends a data signal (reproduced sound signal) of content reproduced sound of the content to the communication OF 750.

The input device 770 is a device capable of detecting the input of the user operation, such as a remote controller. Note that the input device 770 may be a device other than a remote controller as long as it is capable of detecting the input of the user operation. The memory 780 includes at least a RAM and a ROM, for example. RAM functions as a work memory for the processor 760 and temporarily stores the data signals generated or acquired by the processor 760. ROM stores programs or instructions and control data necessary for executing various kinds of processing performed by the processor 760. Note that the memory 780 may include a storage medium such as a flash memory, HDD, SSD, or the like, in addition to RAM and ROM.

The monitor MN may be a display device such as a liquid crystal display (LCD) or an organic electroluminescence (EL). The monitor MN outputs (reproduces) a movie data signal received from the processor 760. The monitor MN may display a notification indicating a state where the sound pressure level of the content reproduced sound is suppressed by the audio control device 701 or a notification indicating a state where the output of the content reproduced sound is stopped (see the message 601 in FIG. 6, for example). As a result, the passenger can easily understand that the sound pressure level of the content reproduced sound is currently suppressed.

Figure 8:
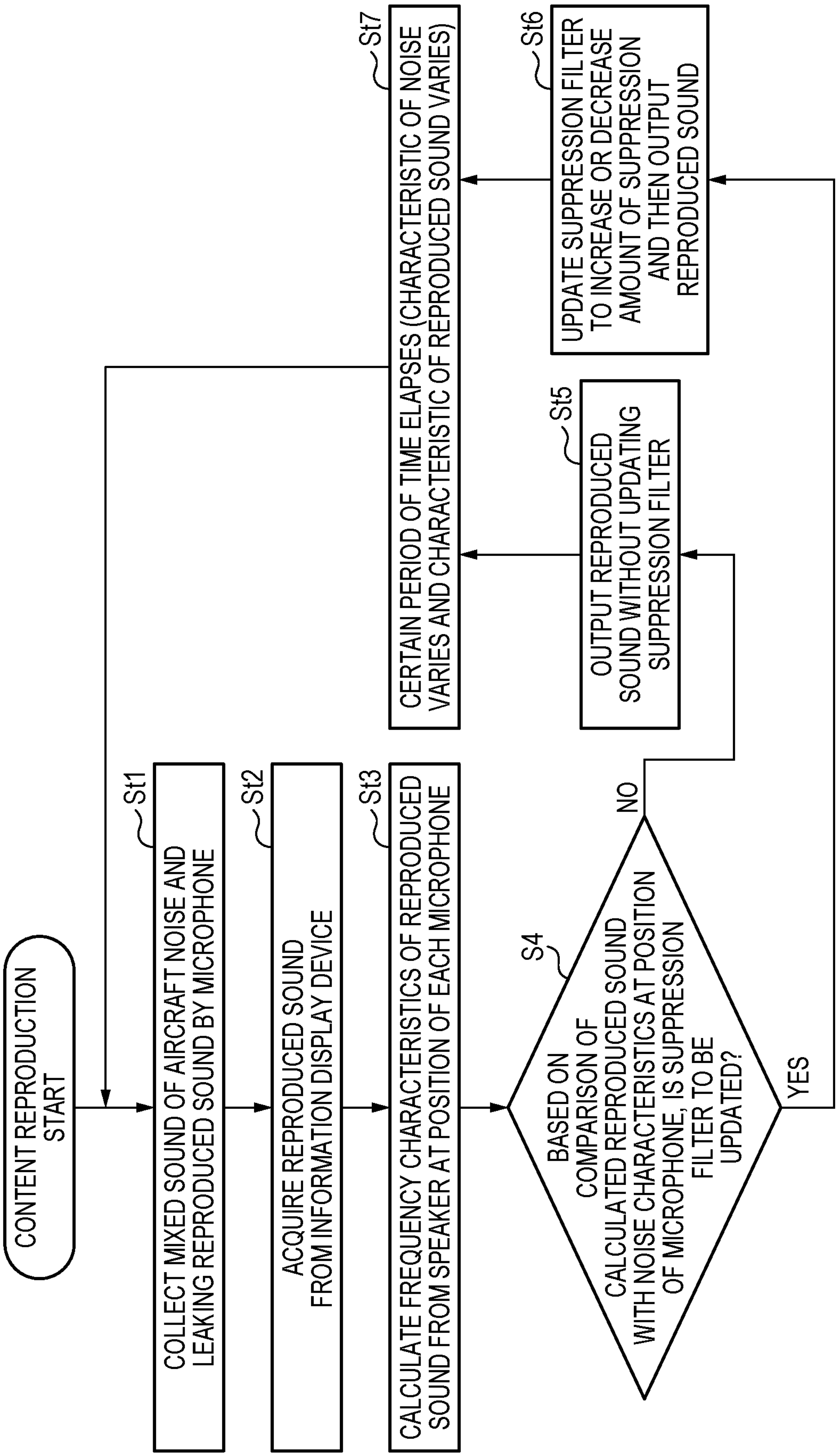
FIG. 8 is a flowchart that defines an example of an operation procedure of the sound reproduction device according to the first embodiment in time series.

Next, with reference to FIG. 8, an operation procedure example of the sound reproduction device 200 (audio control device 701) will be described.

The audio control device 701 acquires the environmental sound signal of the environmental sound (for example, the mixed sounds MXL and MXR that are sounds obtained by mixing the aircraft noise and the leaking reproduced sound output from the speakers 301L and 301R) collected by the microphones 304L and 304R attached to the partition portions 203L and 203R, and calculates the frequency characteristics thereof (step St1).

The DSP 720 acquires from the information display device 204 the data signal (sound data) of the content reproduced sound of a content such as a movie selected by the passenger using the information display device 204 via the communication FF 730, and outputs the reproduced sound signal indicating the content reproduced sound from the reproduced sound output unit 722 (step St2).

By individually convolving each of the four pieces of the characteristic data of the transfer functions TS read from the memory 710 with the reproduced sound signal acquired in step St2, the DSP 720 calculates the frequency characteristics of the calculated reproduced sound signal representing the sound when the content reproduced sound from the speakers 301L and 301R reaches the microphones 304L and 304R (step St3). In step St3, the frequency characteristics of a total of four calculated reproduced sound signals of the content reproduced sound from the two microphones 304L and 304R and the two speakers 301L and 301R, for example, are calculated. The DSP 720 removes the four calculated reproduced sound signals of the content reproduced sound at each of the microphone positions calculated in step St3 from the data signal (environmental sound signal) of the input environmental sound (for example, the mixed sounds MXL and MXR) to calculate the frequency characteristics of the noise sound signal of the aircraft noise included in the mixed sounds MXL and MXR. That is, the frequency characteristics of the noise sound signal are calculated from both the mixed sound MXL collected by the microphone 304L and the mixed sound MXR collected by the microphone 304R.

The DSP 720 individually compares the frequency characteristics of the calculated reproduced sound signal calculated in step St3 with the frequency characteristics of the noise sound signal in the filter determination unit 724, so as to estimate whether there is a frequency band in which the sound leakage occurs, and determines whether the filter coefficient of the suppression filter FL is to be updated (step St4). For example, in the present embodiment, the DSP 720 estimates a frequency band in which the sound pressure level of the noise sound signal is lower than the sound pressure level of the calculated reproduced sound signal as the frequency band in which the sound leakage occurs.

When the filter determination unit 724 estimates that there is no frequency band in which sound leakage occurs and determines that updating the filter coefficient of the suppression filter FL is unnecessary (step St4: NO), the DSP 720 outputs the reproduced sound signal from the reproduced sound output unit 722 without updating the filter coefficient of the suppression filter FL in the filter determination unit 724 (step St5).

When the filter determination unit 724 estimates that there is a frequency band in which sound leakage occurs and determines that it is necessary to update the filter coefficient of the suppression filter FL (step St4: YES), the DSP 720 updates the filter coefficient of the suppression filter FL so as to increase the amount of suppression in the filter determination unit 724, and outputs the reproduced sound signal that passes through the updated suppression filter FL from the reproduced sound output unit 722 (step St6). Note that the updating of the filter coefficient is not limited to the case where the sound leakage is estimated to exist, and it may be performed so that the amount of suppression is reduced for a frequency band in which the sound pressure level of the noise sound signal is sufficiently higher than the sound pressure level of the calculated reproduced sound signal. For example, the filter coefficient may be updated so as to decrease the amount of suppression when the aircraft noise temporarily increases or the content reproduced sound temporarily decreases.

After step St5 or step St6, when a certain period of time elapses (step St7), the processing of the audio control device 701 returns to step St1. It is expected that the characteristics of the aircraft noise and the characteristics of the content reproduced sound change before the certain period of time elapses. In this way, by repeating the processing cycle of steps St1 to St7 in this way, it is possible to suppress the reproduction of the frequency band in which the sound leakage occurs.

Second Embodiment

A sound reproduction device 900 according to a second embodiment will be described with reference to FIG. 9. Note that the same reference numerals are given to the same configurations as those of the sound reproduction device 200 according to the first embodiment, and description thereof will be omitted.

A movable headrest portion is often adopted as the headrest portion provided on the aircraft seat for safety and comfort reasons. On the other hand, in order to reduce the reproduced sound of the speaker 301 while maintaining the volume sensed by the passenger, the closer the partition portion is to the ears of the passenger, the better. Therefore, the sound reproduction device 900 of the present embodiment enables the partition portion to be brought closer to the ears, and thus allows the angle of the partition portion to be changed and the partition portion to be moved.

Figure 9:
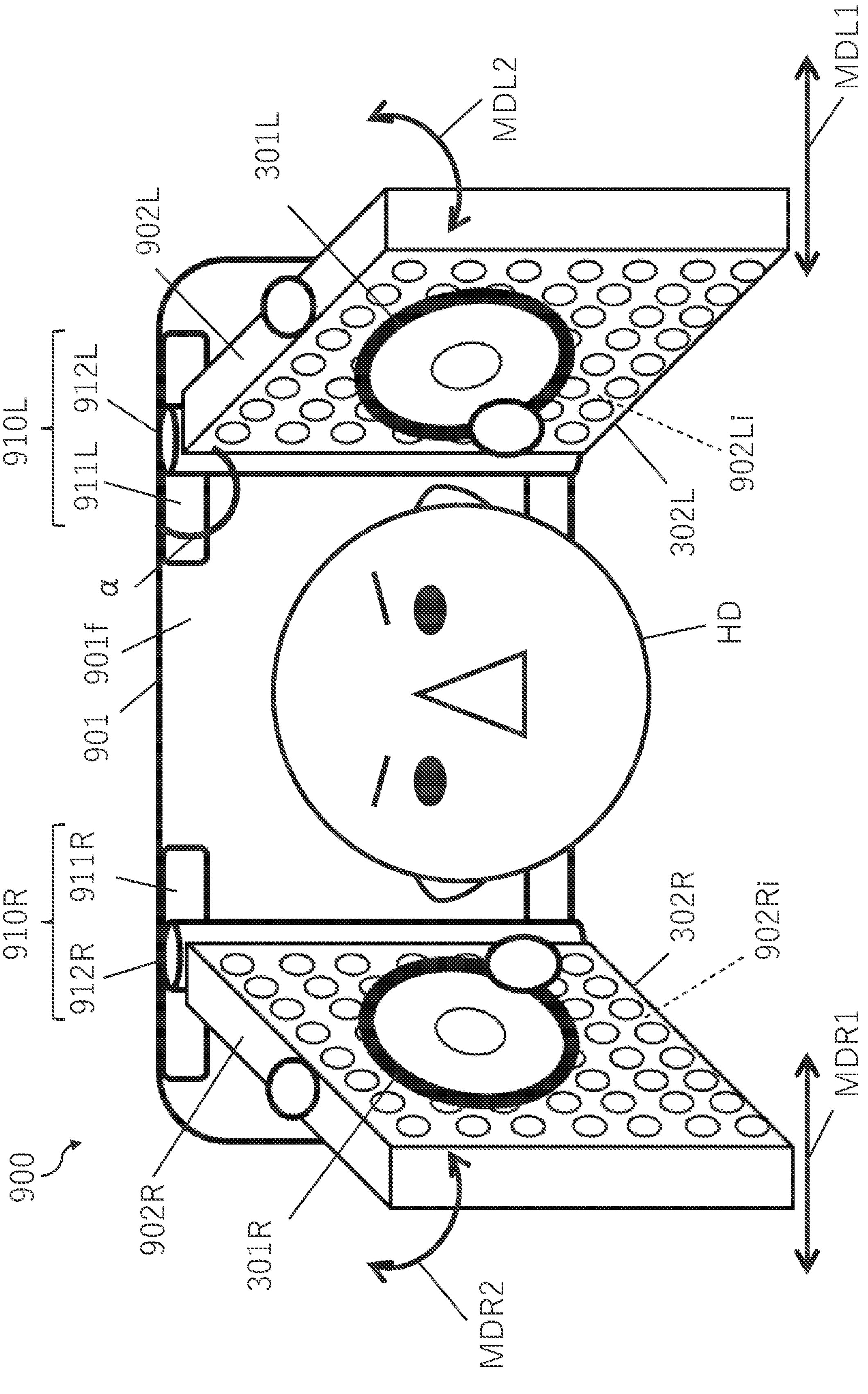
FIG. 9 is a front view of a headrest portion and a surrounding thereof of a sound reproduction device according to a second embodiment, and a passenger, which shows an example in which a partition portion is configured to be movable.

As shown in FIG. 9, the sound reproduction device 900 includes connecting structures 910L and 910R that movably connect partition portions 902L and 902R to a headrest portion 901.

The connecting structure 910L is provided on the headrest portion 901 and includes a slit 911L extending in the left-right direction, and a support portion 912L that slidably engages with the slit 911L and includes a hinge mechanism for rotatably supporting the partition portion 902L. With this configuration, the partition portion 902L can slide in a left-right direction MDL1 along the slit 911L and can rotate in a rotation direction MDL2 around the support portion 912L. Similarly, the connecting structure 910R is provided on the headrest portion 901 and includes a slit 911R extending in the left-right direction, and a support portion 912R that slidably engages with the slit 911R and includes a hinge mechanism for rotatably supporting the partition portion 902R. With this configuration, the partition portion 902R can slide in a left-right direction MDR1 along the slit 911R and can rotate in a rotation direction MDR2 around the support portion 912R.

The closer the speakers 301L and 301R and the sound absorbing structures 302L and 302R are to the head HD of the passenger, the more it is possible to prevent the sound leakage, and the smaller the angles of the partition portions 902L and 902R, the more it is possible to prevent the sound leakage. For this reason, it is desirable that the connecting structures 910L and 910R limit an angle α between inner surfaces 902Li and 902Ri of the partition portions 902L and 902R and a front surface 901*f* of the headrest portion 901 to 135 degrees or less.

Note that the extending direction of the slits 911L and 911R is not limited to the left-right direction, and may extend in any desired direction. The connecting structures 901L and 901R are not limited to the configuration of including the slit and the support portion, and may be a configuration for making the partition portion movable.

The connecting structures 901L and 901R may be configured such that the partition portions 902L and 902R are attached to the headrest portion 901 so that only one of the angle and the position of the partition portions 902L and 902R with respect to the headrest portion 901 can be adjusted.

In order to prevent sound leakage, the position and/or the angle of the partition portions 902L and 902R may be detected, and the output of the content reproduced sound from the speakers 301L and 301R may be stopped based on the detection result.

Third Embodiment

A sound reproduction device 1000 according to a third embodiment will be described with reference to FIG. 10.

Some aircraft seats can be used in a fully flat bed state for comfort. Therefore, the sound reproduction device 1000 of the present embodiment is provided with a detachable structure that allows the partition portion to be detached, thereby making it possible to achieve both prevention of sound leakage and comfort. Note that the same reference numerals are given to the same configurations as those of the sound reproduction device 200 according to the first embodiment, and description thereof will be omitted. The sound reproduction device 1000 may have at least one configuration of the first and second embodiments.

Figure 10:
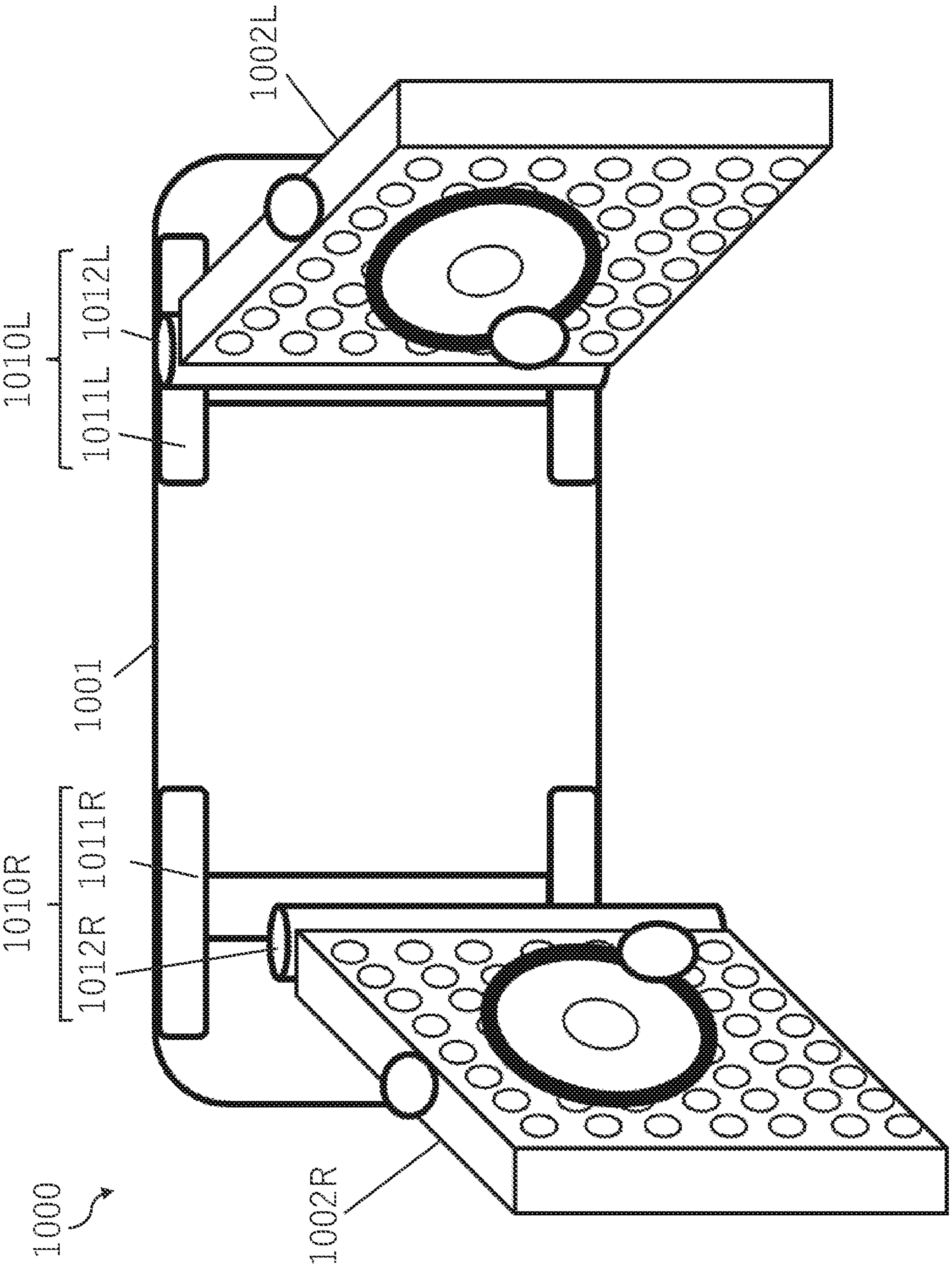
FIG. 10 is a front view of a headrest portion and a surrounding thereof of a sound reproduction device according to a third embodiment, which shows an example in which a partition portion is configured to be detachable.

As shown in FIG. 10, the sound reproduction device 1000 includes connecting structures 1010L and 1010R that detachably connect partition portions 1002L and 1002R to a headrest portion 1001.

The connecting structure 1010L includes an engaged portion 1011L provided on the headrest portion 1001, and an engaging portion 1012L provided on the partition portion 1002L and detachably engaged with the engaged portion 1011L of the headrest portion 1001. Similarly, the connecting structure 1010R includes an engaged portion 1011R provided on the headrest portion 1001, and an engaging portion 1012R provided on the partition portion 1002R and detachably engaged with the engaged portion 1011R of the headrest portion 1001. With this configuration, the partition portions 1002L and 1002R can be detached from the headrest portion 1001.

Note that the connecting structures 1010L and 1010R may movably connect the partition portions 1002L and 1002R to the headrest portion 1001 as in the second embodiment. In order to prevent sound leakage, attachment and detachment of the partition portions 1002L and 1002R may be detected, and whether the content can be reproduced from the speaker 304 may be displayed on the information display device 204 based on the detection result.

Fourth Embodiment

A sound reproduction device 1100 according to a fourth embodiment will be described with reference to FIG. 11.

Figure 11:
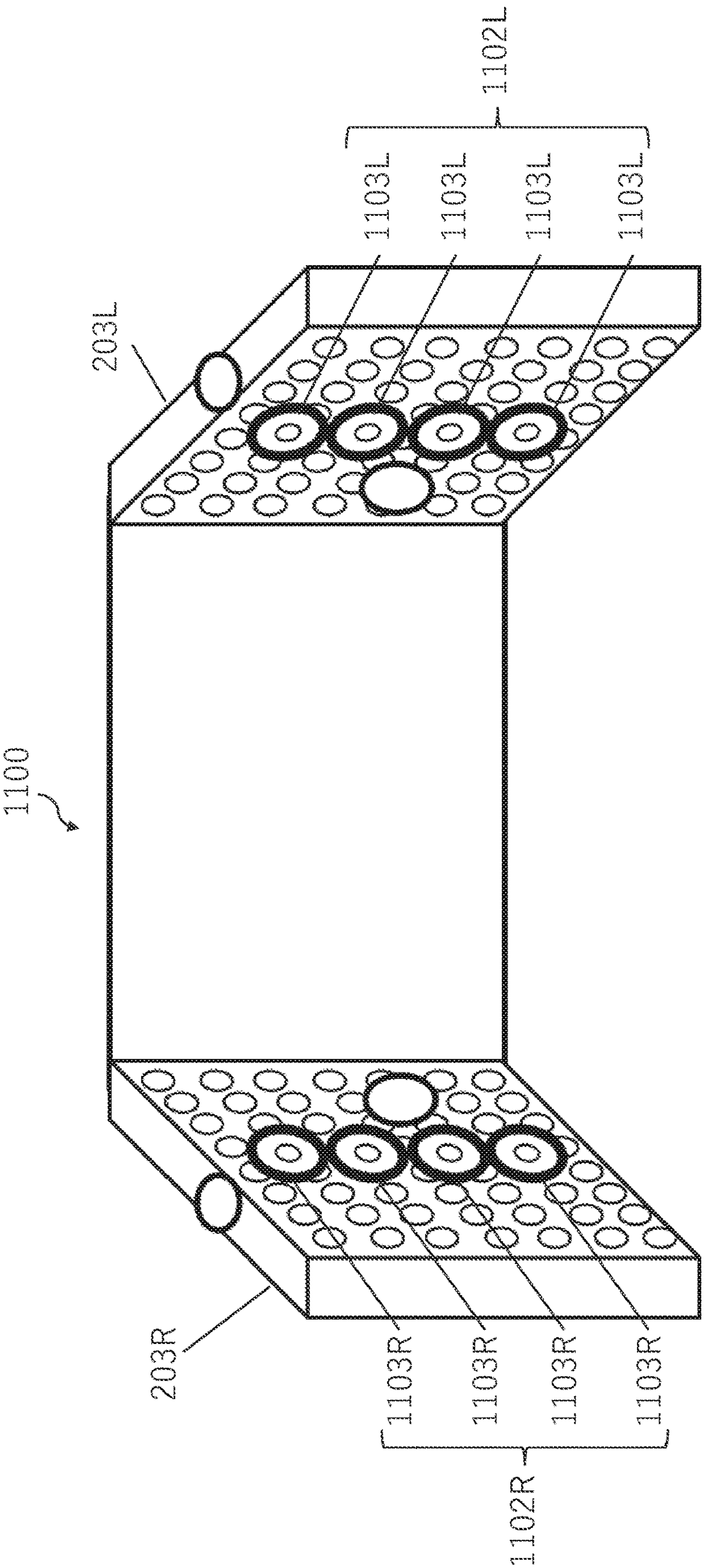
FIG. 11 is a front view of a headrest portion and a surrounding thereof of a sound reproduction device according to a fourth embodiment, which shows an example of a speaker including a plurality of speaker elements arranged in an array.

As shown in FIG. 11, the sound reproduction device 1100 includes speakers 1102L and 1102R instead of the speakers 301L and 301R of the sound reproduction device 200 of the first embodiment. Note that the same reference numerals are given to the same configurations as those of the sound reproduction device 200 according to the first embodiment, and description thereof will be omitted. The sound reproduction device 1100 may have at least one configuration of the first to third embodiments.

The speaker 1102L includes a plurality of speaker elements 1103L arranged in an array. Similarly, the speaker 1102R includes a plurality of speaker elements 1103R arranged in an array. By arranging the plurality of speaker elements 1103L and 1103R in a row and controlling a phase of each speaker element 1103L and 1103R, it becomes possible to control directivity of the reproduced sound in a vertical direction, and it is possible to construct a reproduction environment that does not leak vertically. Sound leakage can be further prevented by using such speakers 1102L and 1102R.

Note that two-dimensional directivity may be controlled by arranging a plurality of rows and a plurality of columns of speaker elements on a plane of the speaker.

Fifth Embodiment

A sound reproduction device 1200 according to a fifth embodiment will be described with reference to FIG. 12. Note that the same reference numerals are given to the same configurations as those of the sound reproduction device 200 according to the first embodiment, and description thereof will be omitted. The sound reproduction device 1200 may have at least one configuration of the first to fourth embodiments.

Figure 12:
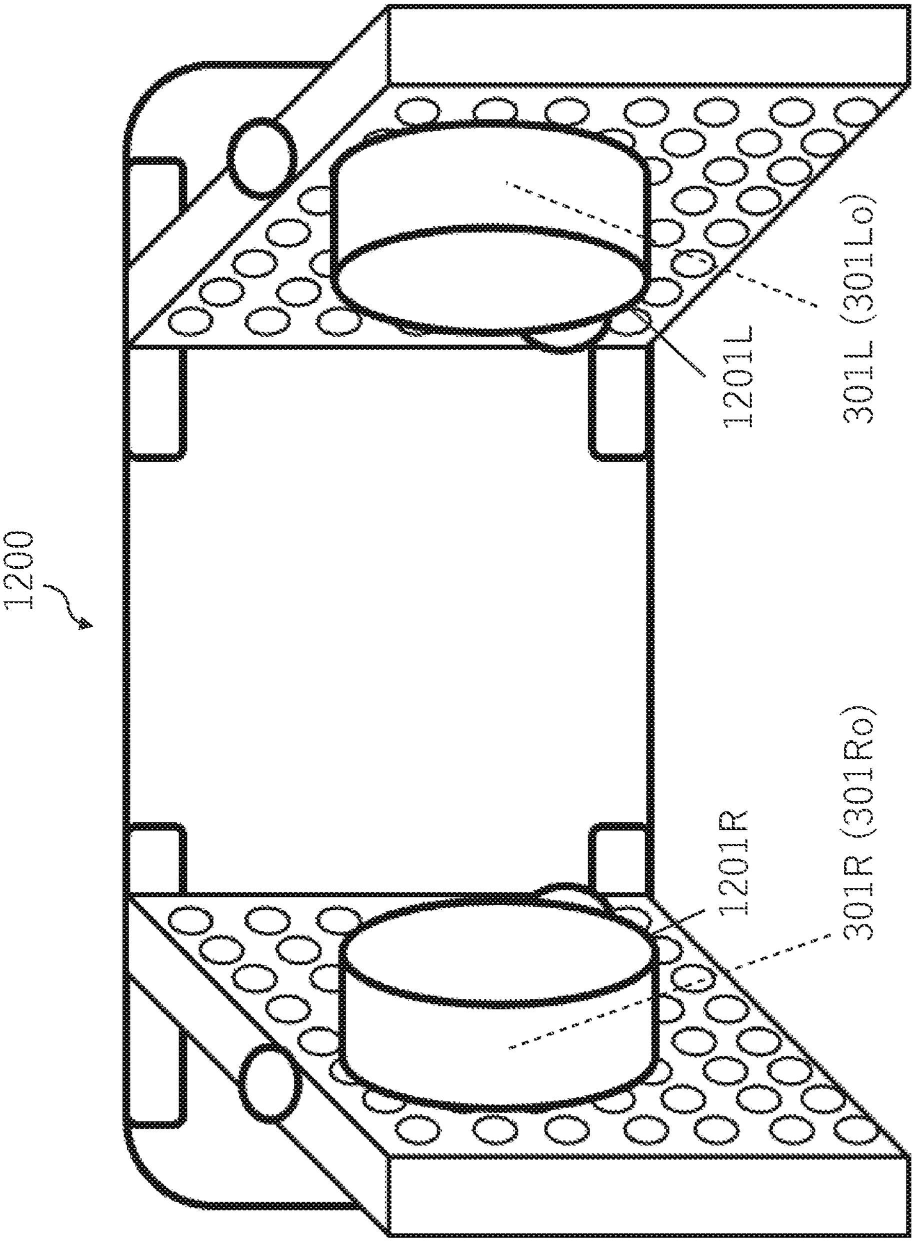
FIG. 12 is a front view of a headrest portion and a surrounding thereof of a sound reproduction device according to a fifth embodiment, which shows an example in which an acoustic lens for directivity control is disposed on an output surface of a speaker.

As shown in FIG. 12, the sound reproduction device 1200 includes acoustic lenses 1201L and 1201R disposed on the output surfaces 301Lo and 103Ro of the speakers 301L and 301R, respectively. The acoustic lenses 1201L and 1201R have a configuration that gives sound directivity to a specific angle. By disposing the acoustic lenses 1201L and 1201R on the output surfaces 301Lo and 301Ro of the speakers 301L and 301R, the sound output from the speakers 301L and 301R via the acoustic lenses 1201L and 1201R has directivity with respect to a specific angle, and therefore, it is possible to further prevent sound leakage.

Sixth Embodiment

A sound reproduction device 1300 according to a sixth embodiment will be described with reference to FIGS. 13 and 14. Note that the same reference numerals are given to the same configurations as those of the sound reproduction device 200 according to the first embodiment, and description thereof will be omitted. The sound reproduction device 1300 may have at least one configuration of the first to fifth embodiments.

Figure 13:
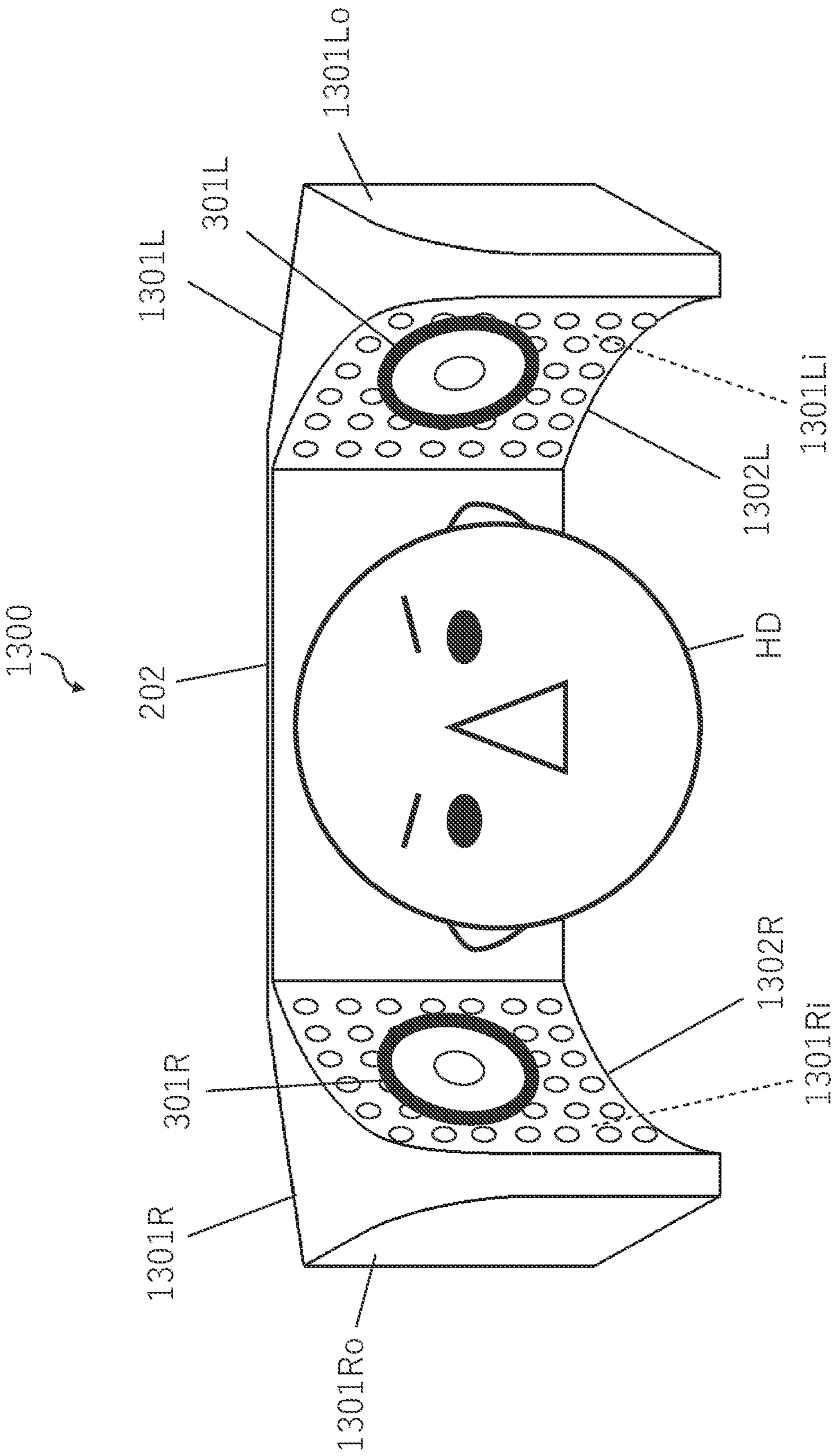
FIG. 13 is a front view of a headrest portion and a surrounding thereof of a sound reproduction device according to a sixth embodiment, and a passenger, which shows an example of a partition portion that includes a curved surface on the passenger side where a sound absorbing structure is provided, and has a protruding structure that is not parallel to the passenger side surface on a side opposite to the passenger.
Figure 14:
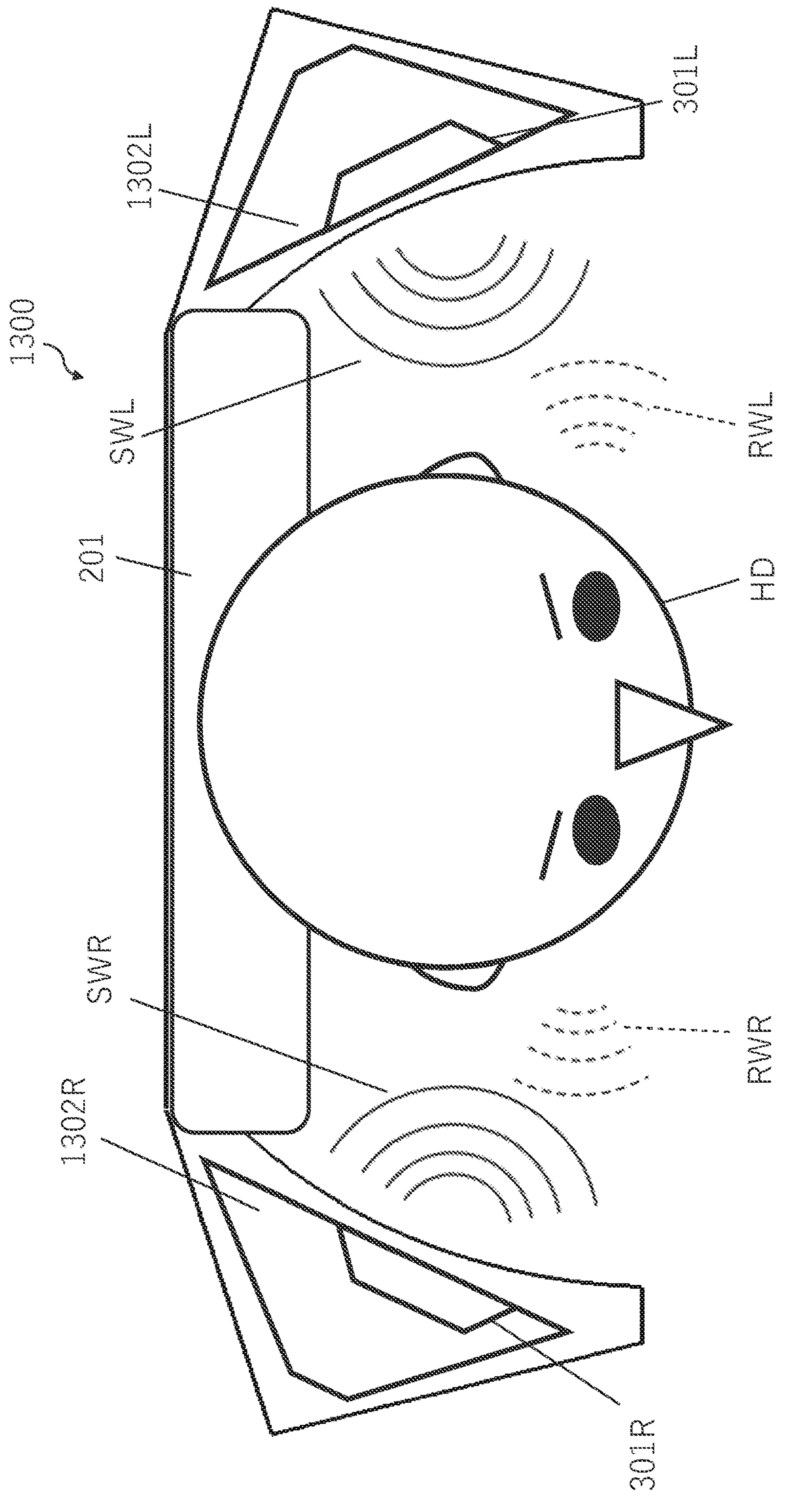
FIG. 14 is a top view of the headrest portion and the surrounding thereof of the sound reproduction device according to the sixth embodiment, and the passenger.

As shown in FIGS. 13 and 14, the sound reproduction device 1300 includes partition portions 1301L and 1301R. Inner surfaces 1301Li and 1301Ri of the partition portions 1301L and 1301R, that is, surfaces of sound absorbing structures 1302L and 1302R that face the head HD of the passenger are not flat but curved (for example, concave). Outer surfaces 1301Lo and 1301Ro of the partition portions 1301L and 1301R, that is, surfaces on a side opposite to the head HD of the passenger, are not parallel to the surfaces on the head HD of the passenger side and have a shape protruding outward.

By forming the inner surfaces 1301Li and 1301Ri of the partition portions 1301L and 1301R into curved surfaces, positions of front end portions of the inner surfaces 1301Li and 1301Ri are closer to the head HD of the passenger than positions where the speakers 301L and 301R are provided, and therefore, it is possible to prevent the spread of the reproduced sound wave surfaces SWL and SWR and the reflected wave surfaces RWL and RWR of the content. By forming the outer surfaces 1301Lo and 1301Ro of the partition portions 1301L and 1301R to protrude outward, it is possible to ensure a space for members stored in the partition portions 1301L and 1301R, such as the speakers 301L and 301R.

Seventh Embodiment

Figure 15A:
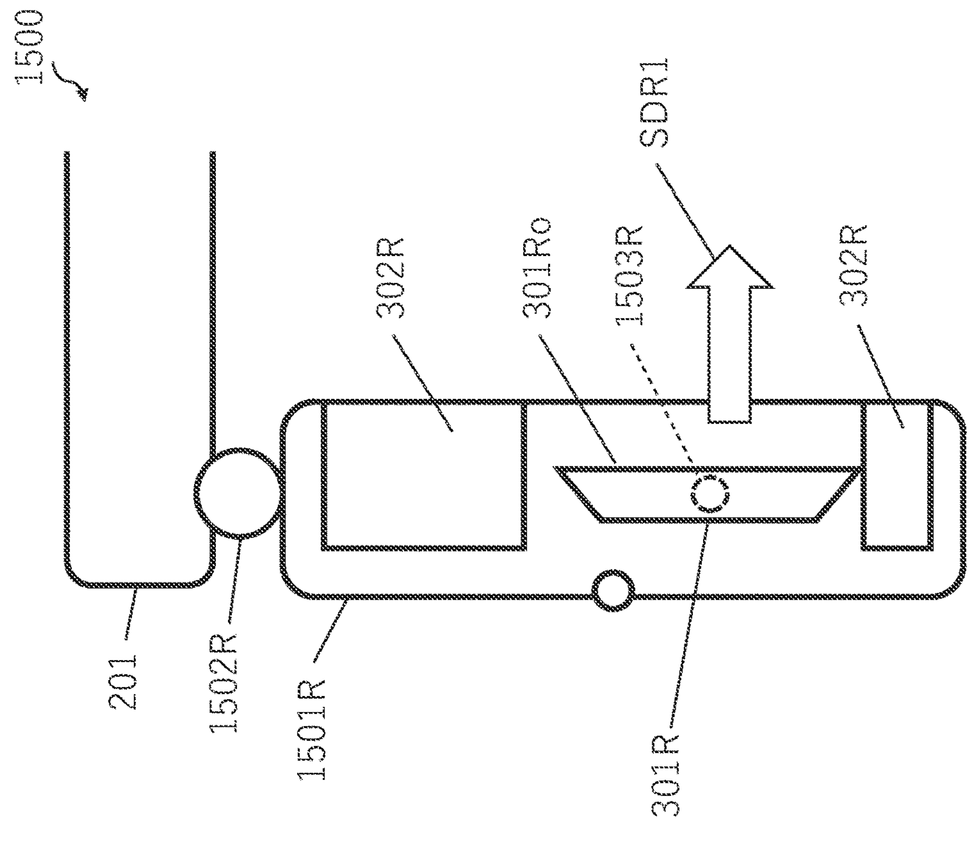
FIG. 15A is a top view of a part of a headrest portion and a surrounding thereof of a sound reproduction device according to a seventh embodiment, which shows an example in which both a speaker and a partition portion provided with a sound absorbing structure are configured to be movable.
Figure 15B:
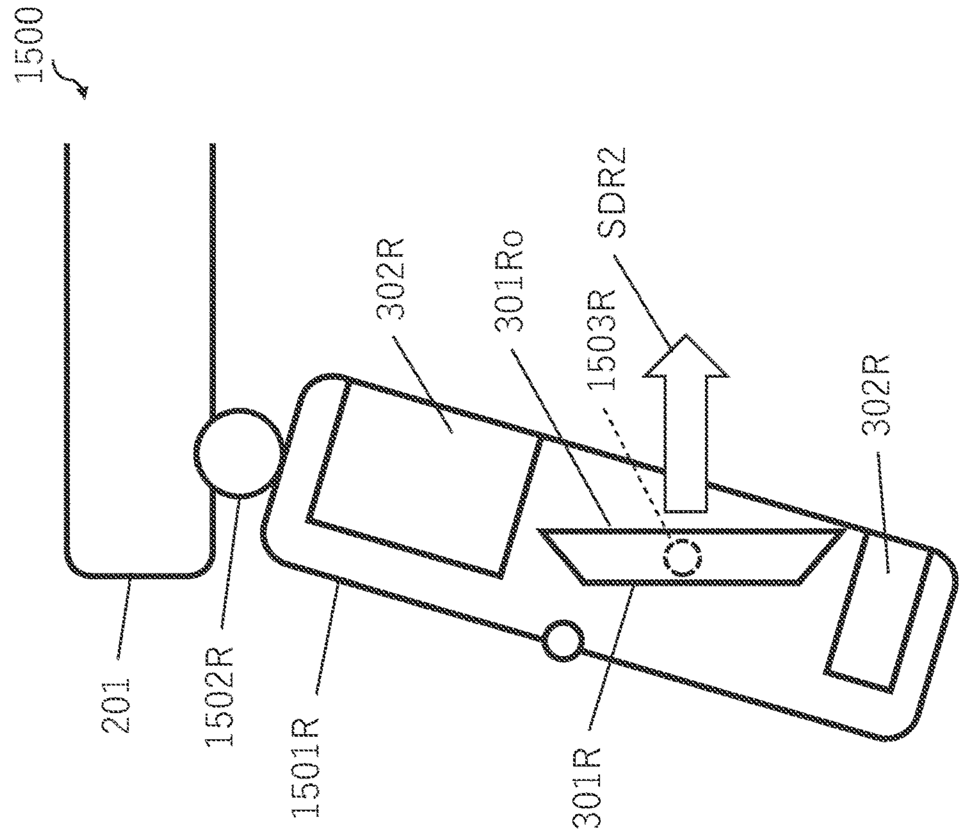
FIG. 15B is a top view of a part of the headrest portion and the surrounding thereof of the sound reproduction device according to the seventh embodiment, which shows an example of orientation of the speaker when the partition portion is moved from the state shown in FIG. 15A.

A sound reproduction device 1500 according to a seventh embodiment will be described with reference to FIGS. 15A and 15B. Note that the same reference numerals are given to the same configurations as those of the sound reproduction device 200 according to the first embodiment, and description thereof will be omitted. The sound reproduction device 1500 may have at least one configuration of the first to sixth embodiments.

The sound reproduction device 1500 includes a connecting portion 1502R that rotatably connects a partition portion 1501R to the headrest portion 201, and a connecting portion 1503R that rotatably connects the speaker 301R to a partition portion 1501R.

That is, the speaker 301R is not directly fixed to the partition portion 1501R, and the partition portion 1501R and the speaker 301R are movable separately. With this configuration, even when the angle of the partition portion 1501R is changed, for example, by always directing the direction of the content reproduced sound from the speaker 301R to the head of the passenger (that is, by adjusting the angle of the speaker 301R with respect to the partition portion 1501R so that a direction SDR1 of the content reproduced sound before changing the angle of the partition portion 1501R and a direction SDR2 of the content reproduced sound after changing the angle of the partition portion 1501R do not change), it is possible to prevent sound leakage while improving the sound pressure of the sound output from the speaker 301R.

Note that the sound reproduction device 1500 may have a structure in which the connecting portion 1502R and the connecting portion 1503R are interlocked so that the output surface 301Ro of the speaker 301R is always oriented in the same direction. Although FIGS. 15A and 15B show only the right partition portion 1501R, the left partition portion may be similarly configured.

Eighth Embodiment

A sound reproduction device 1600 according to an eighth embodiment will be described with reference to FIGS. 16 to 18. Note that the same reference numerals are given to the same configurations as those of the sound reproduction device 200 according to the first embodiment, and description thereof will be omitted. The sound reproduction device 1600 may have at least one configuration of the first to seventh embodiments.

In the present embodiment, an example of processing when the position of the head HD of the passenger is biased with respect to the speakers 301L and 301R will be described.

Figure 16:
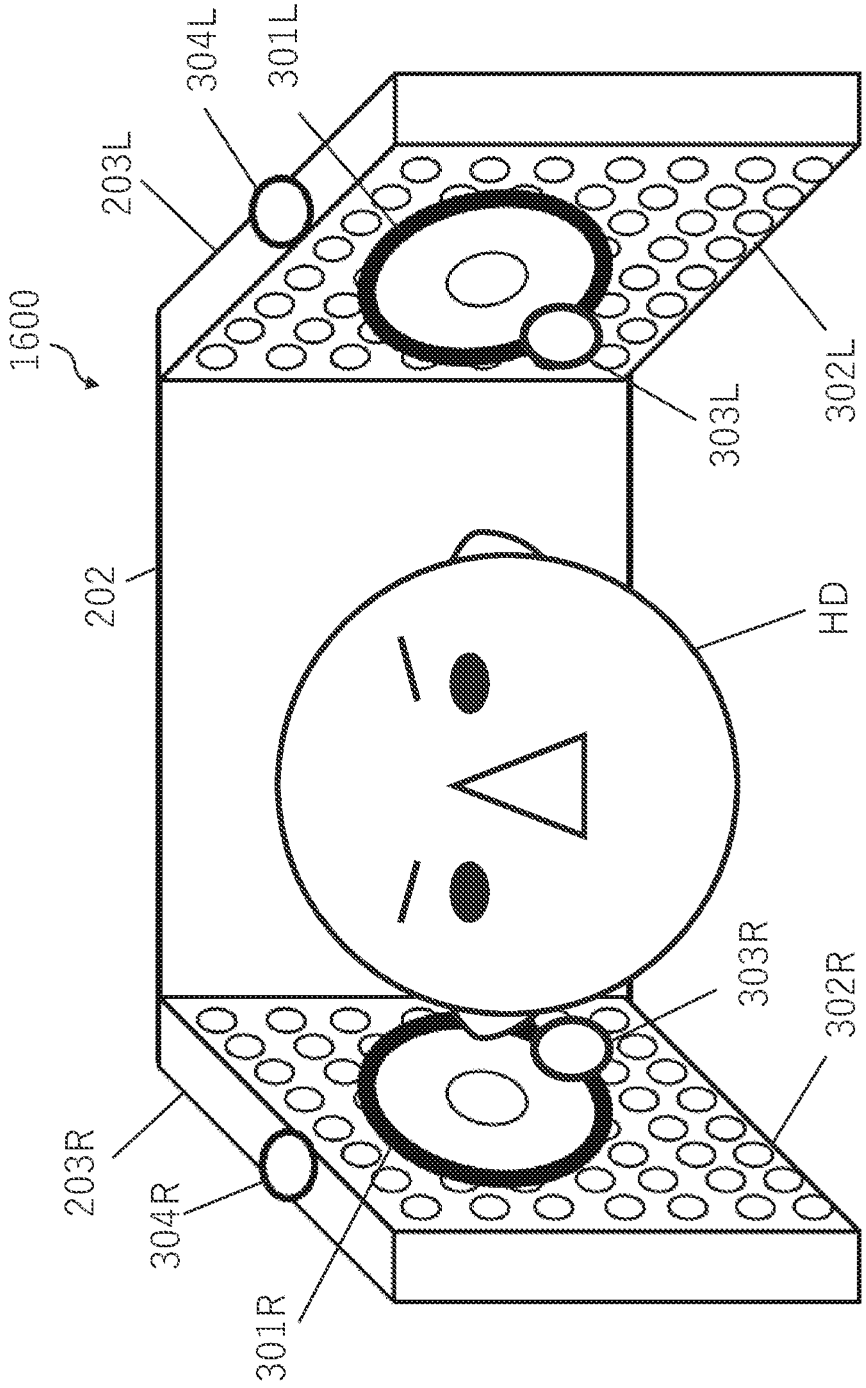
FIG. 16 is a front view of a headrest portion and a surrounding thereof of a sound reproduction device according to an eighth embodiment, and a passenger, which shows a case where a position of the head of the passenger is biased with respect to a speaker.

FIG. 16 shows a front view when the position of the head HD of the passenger is biased with respect to the speakers 301L and 301R. In this example, a right ear of the passenger is closer to speaker 301R and a left ear is farther from speaker 301L. Therefore, the sound reproduction device 1600 detects the position of the head HD of the passenger using the head detection sensor 303 and the camera 205, and changes the left and right volumes of the content reproduced sound output from the speakers 301L and 301R based on the detection result, so that it is possible to adjust the left and right sound volume balance sensed by the passenger. By measuring the transfer functions indicating the plurality of transfer characteristics between the speakers 301L, 301R and the microphones 304L, 04R in advance based on the position of the head HD, and switching the characteristics of the transfer function based on the detection result of the position of the head HD of the passenger, it is possible to efficiently prevent sound leakage using the suppression filter.

Figure 17:
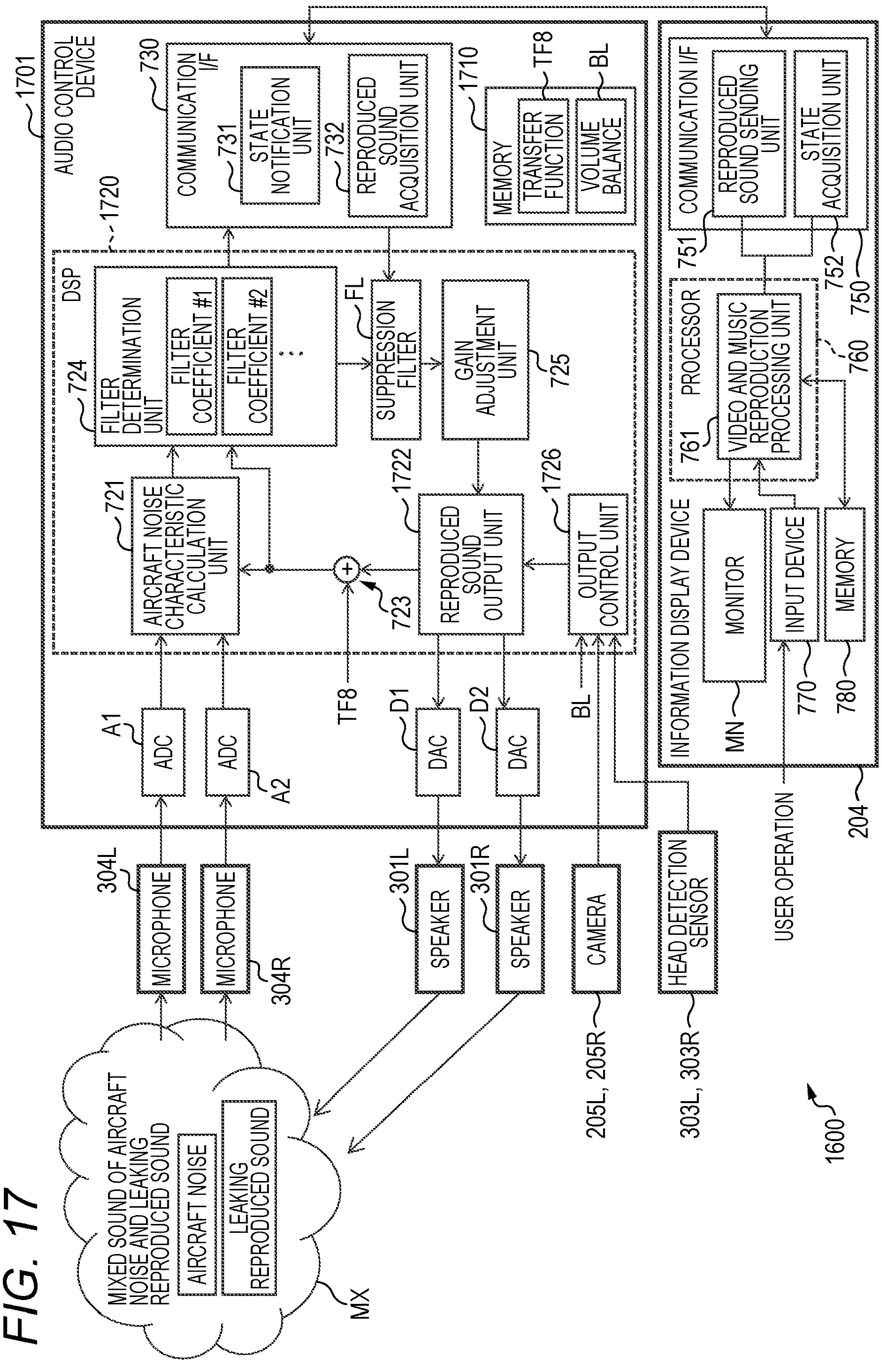
FIG. 17 is a diagram showing an internal configuration example of the sound reproduction device according to the eighth embodiment.
Figure 18:
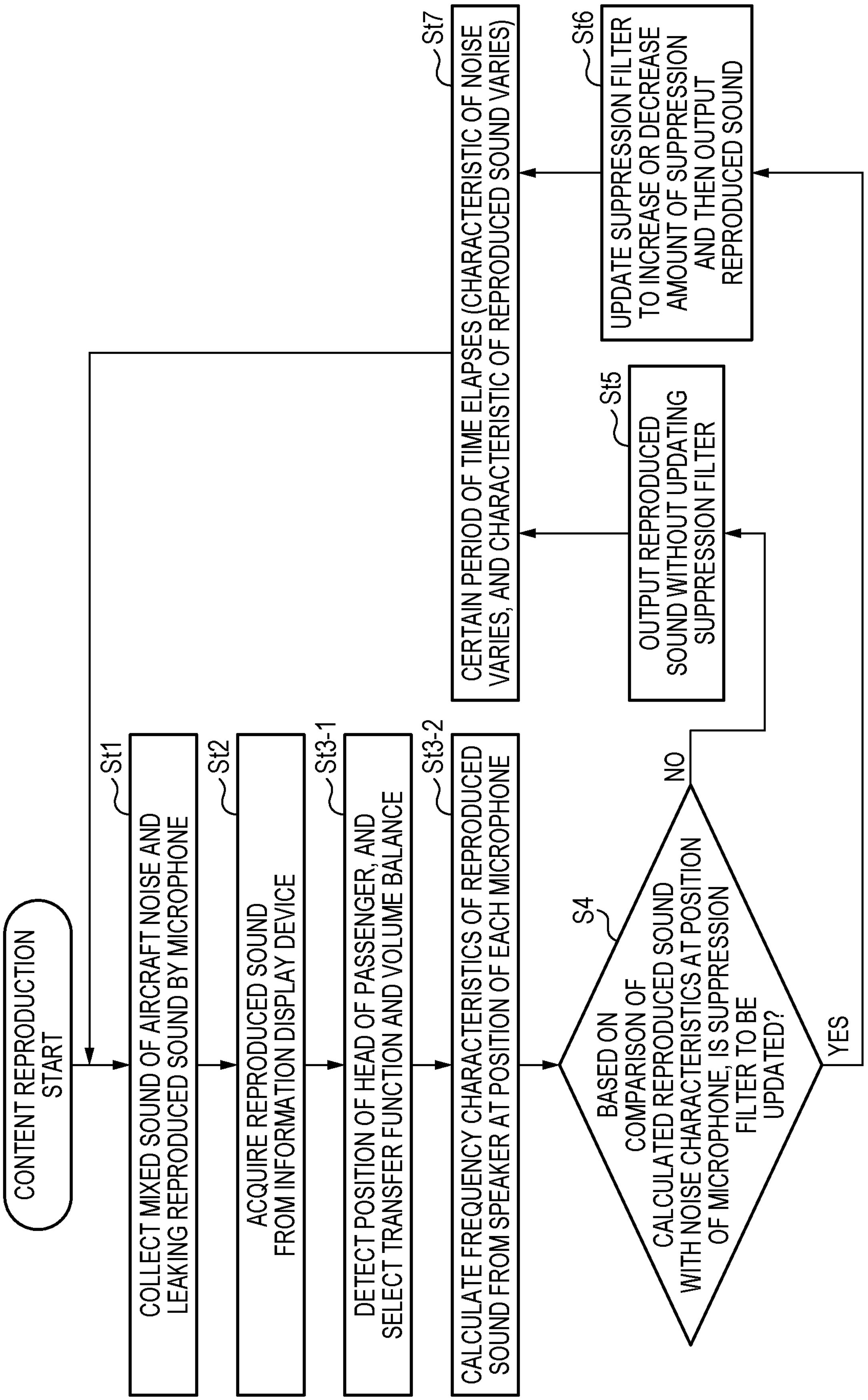
FIG. 18 is a flowchart that defines an example of an operation procedure of the sound reproduction device according to the eighth embodiment in time series.

FIG. 17 is a diagram showing an internal configuration example of the sound reproduction device 1600 according to the eighth embodiment. The internal configuration example of the sound reproduction device 1600 differs from that of the sound reproduction device 200 according to the first embodiment shown in FIG. 7 in that a DSP 1720 of an audio control device 1701 includes a memory 1710, a reproduced sound output unit 1722, and an output control unit 1726. Since other parts are the same as those in FIG. 7, description thereof will be omitted.

The memory 1710 stores a transfer function TF8 and a volume balance BL.

Similar to the transfer function TF of the first embodiment, the transfer function TF8 expresses the transfer characteristics between the microphones and the speakers in a frequency domain, and has characteristic data for each combination of the microphones 304L, 304R and the speakers 301L, 301R. The transfer function TF8 further has characteristic data based on data obtained by pre-measuring the transfer characteristics based on the position of the head for each of these combinations.

The volume balance BL has data that determines the volume balance of the content reproduced sound output from the speaker 301L and the speaker 301R based on the position of the head.

The output control unit 1726 acquires detection signals from the cameras 205L and 205R or the head detection sensors 303L and 303R, and controls the reproduced sound signal output from the reproduced sound output unit 1722 based on the detection signals. Specifically, the output control unit 1726 determines the position of the head HD of the passenger based on the detection signal, and selects the transfer characteristics of the transfer function TF8 read from the memory 1710 and output to the calculator 723 based on the determination result. The output control unit 1726 also generates a volume balance control signal based on the volume balance BL read from the memory 1710 based on the determination result of the position of the head HD of the passenger, and outputs the volume balance control signal to the reproduced sound output unit 1722.

Based on the volume balance control signal from the output control unit 1726, the reproduced sound output unit 1722 adjusts the volume of each of the reproduced sound signals output to the speakers 301L and 301R as necessary.

Note that the output control unit 1726 may output the volume balance control signal to the gain adjustment unit 725, and the gain adjustment unit 725 may adjust the gain of the reproduced sound signal based on the volume balance control signal.

Next, with reference to FIG. 18, an operation procedure example of the sound reproduction device 1600 (audio control device 1701) will be described. In this operation procedure example, a case where the position of the head HD of the passenger is biased with respect to the speakers 301L and 301R will be described. Note that since steps St1, St2, and St4 to St7 shown in FIG. 18 are the same as those in FIG. 8, description thereof will be omitted, and only steps St3-1 and St3-2 will be described.

In step St3-1, the output control unit 1726 of the audio control device 1701 detects the position of the head HD of the passenger using the head detection sensor 303 or the camera 205, and selects the optimum transfer characteristics from the transfer function TF8, and adjusts the volume or gain of the reproduced sound signal based on the volume balance BL. Next, in step St3-2, the frequency characteristics of the calculated reproduced sound signal representing the sound when the content reproduced sound from the speakers 301L and 301R reaches the microphones 304L and 304R are calculated by convolving the transfer characteristics selected in step st3-1 with the reproduced sound signal whose volume or gain is adjusted in step st3-1 (step St3-2).

With the sound reproduction device 1600 according to the eighth embodiment, even when the position of the head HD of the passenger is biased with respect to the speakers 301L and 301R, it is possible to appropriately provide the content reproduced sound to the passenger and prevent sound leakage.

Ninth Embodiment

A sound reproduction device 1900 according to a ninth embodiment will be described with reference to FIGS. 19 to 23. Partition portions 1901L and 1901R of the sound reproduction device 1900 include a cushion structure for protecting the head HD of the passenger. Note that the same reference numerals are given to the same configurations as those of the sound reproduction device 200 according to the first embodiment, and description thereof will be omitted. The sound reproduction device 1900 may have at least one configuration of the first to eighth embodiments.

Figure 19:
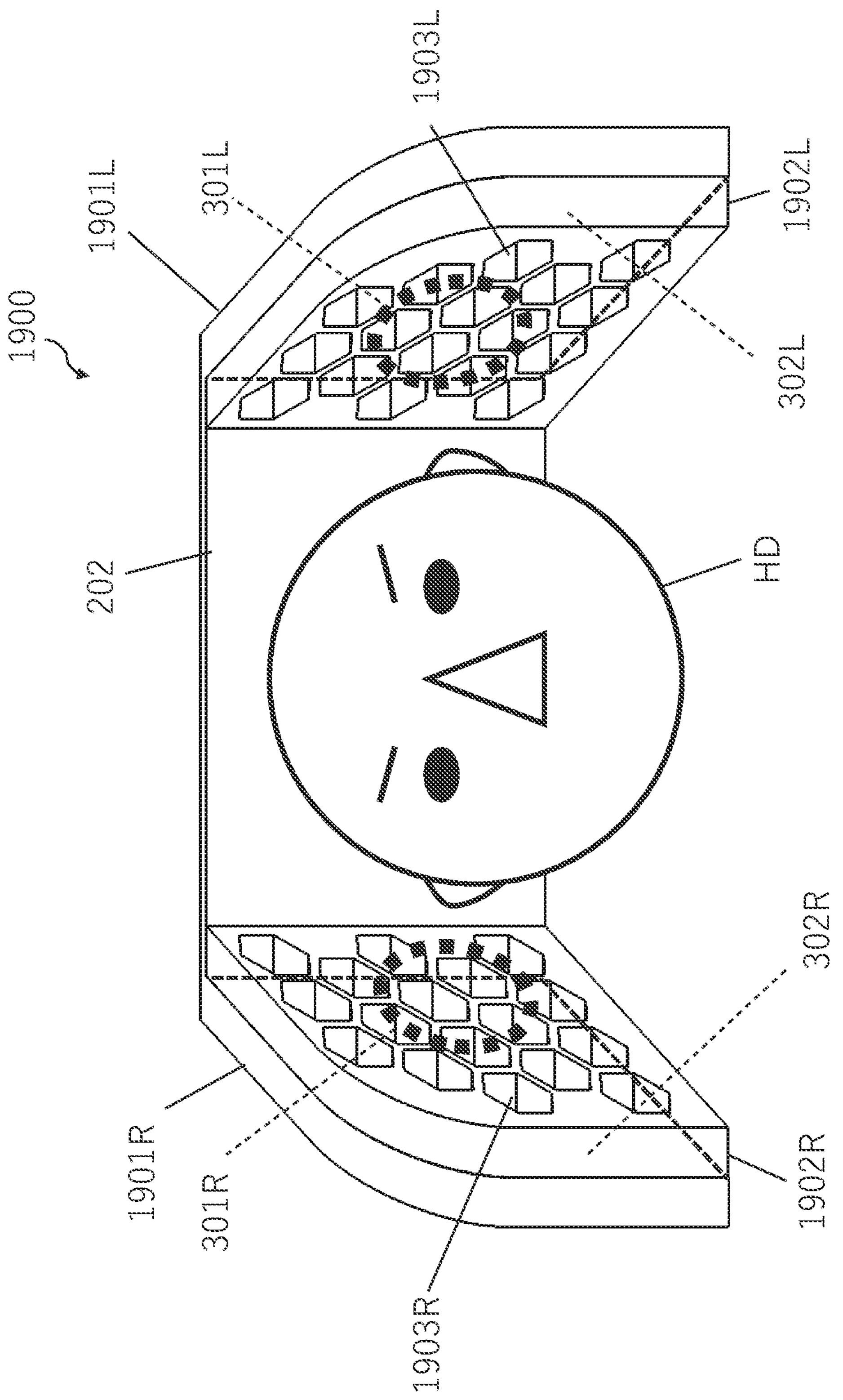
FIG. 19 is a front view of a headrest portion and a surrounding thereof of a sound reproduction device according to a ninth embodiment, and a passenger, which shows an example in which an open cushion with a certain opening ratio is disposed on the passenger side of a partition portion where a sound absorbing structure is provided.

As shown in FIG. 19, the partition portions 1901L and 1901R respectively include open cushions 1902L and 1902R (an example of a first cushion) disposed on surfaces on which the sound absorbing structures 302L and 302R are provided of the partition portions 1901L and 1901R. The open cushions 1902L and 1902R are disposed to cover the entire surfaces of the sound absorbing structures 302L and 302R, respectively. The open cushions 1902L and 1902R are elastic bodies and are provided with a plurality of openings 1903L and 1903R opened at a constant opening ratio. The speakers 301L, 301R and the sound absorbing structures 302L, 302R disposed on the partition portions 1901L, 1901R are exposed from the openings 1903L, 1903R. With this configuration, an air flow path between the head HD of the passenger and the speaker 301 or the sound absorbing structure 302 can be formed.

Figure 20:
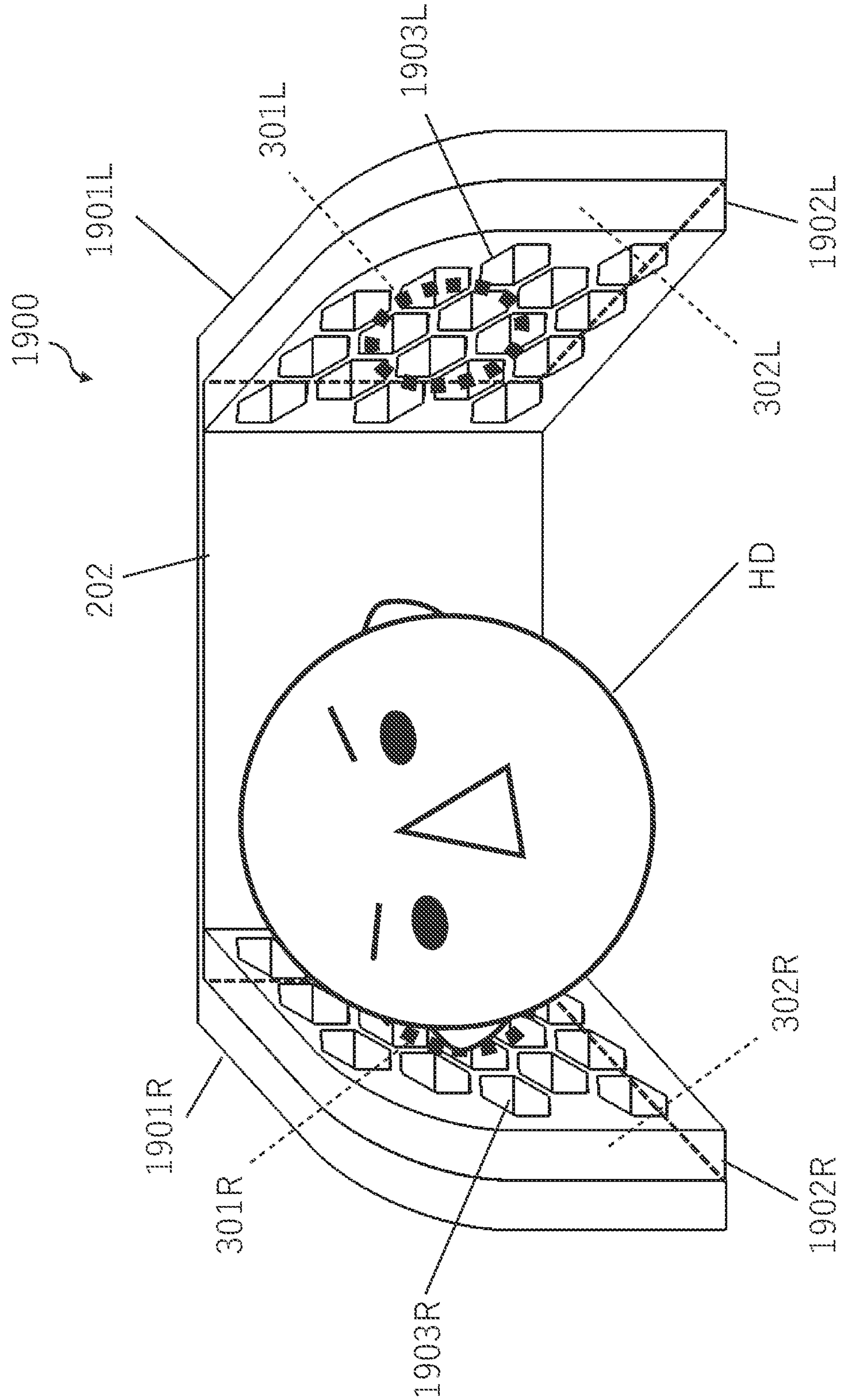
FIG. 20 is a front view of the headrest portion and the surrounding thereof of the sound reproduction device according to the ninth embodiment, and the passenger, which shows a state in which the head of the passenger is supported by the open cushion when the head of the passenger leans against the partition portion.

As shown in FIG. 20, when the head HD of the passenger leans against the partition portion 1901R, the head HD of the passenger is supported by the open cushion 1902R. In this case, the openings 1903R of the open cushion 1902R are not completely crushed. Therefore, the distance between the head HD of the passenger and the speaker 301R or the sound absorbing structure 302R is increased without contact. Therefore, the opening 1903R can maintain the air flow path with the speaker 301R or the sound absorbing structure 302R regardless of the position of the head HD of the passenger.

Figure 21:
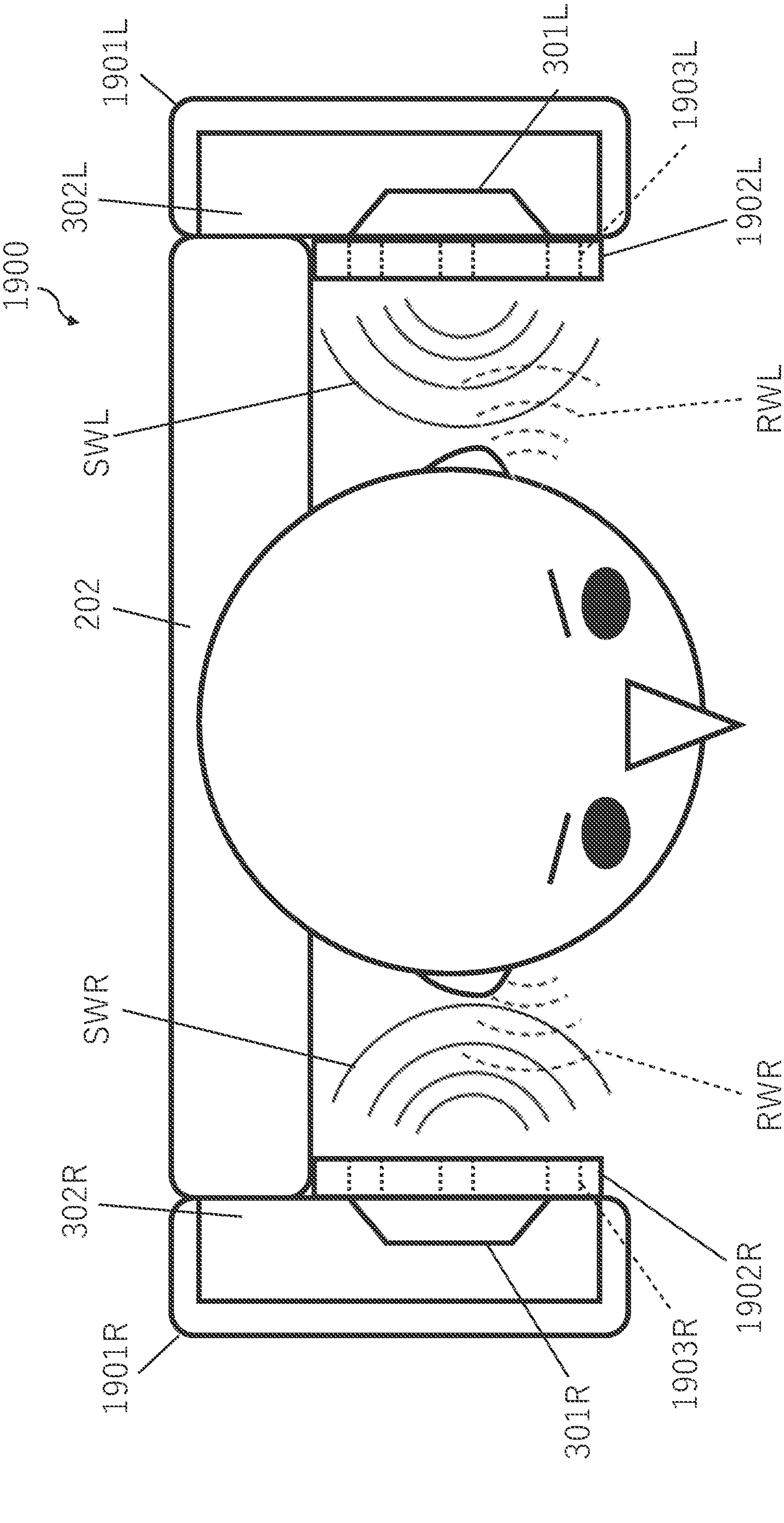
FIG. 21 is a top view of the headrest portion and the surrounding thereof of the sound reproduction device according to the ninth embodiment, and the passenger.

As shown in FIG. 21, since the openings 1903L and 1903R provided on the open cushions 1902L and 1902R serve as the air flow paths, the reproduced sound wave surfaces SWL and SWR output from the speakers 301L and 301R and the reflected wave surfaces RWL and RWR of the reproduced sound pass through the open cushions 1903L and 1903R. Therefore, as in FIG. 4, the reproduced sound wave surfaces SWL and SWR reach the ears of the passenger, and are absorbed by the sound absorbing structure 302 so that the reflection thereof is prevented.

Figure 22:
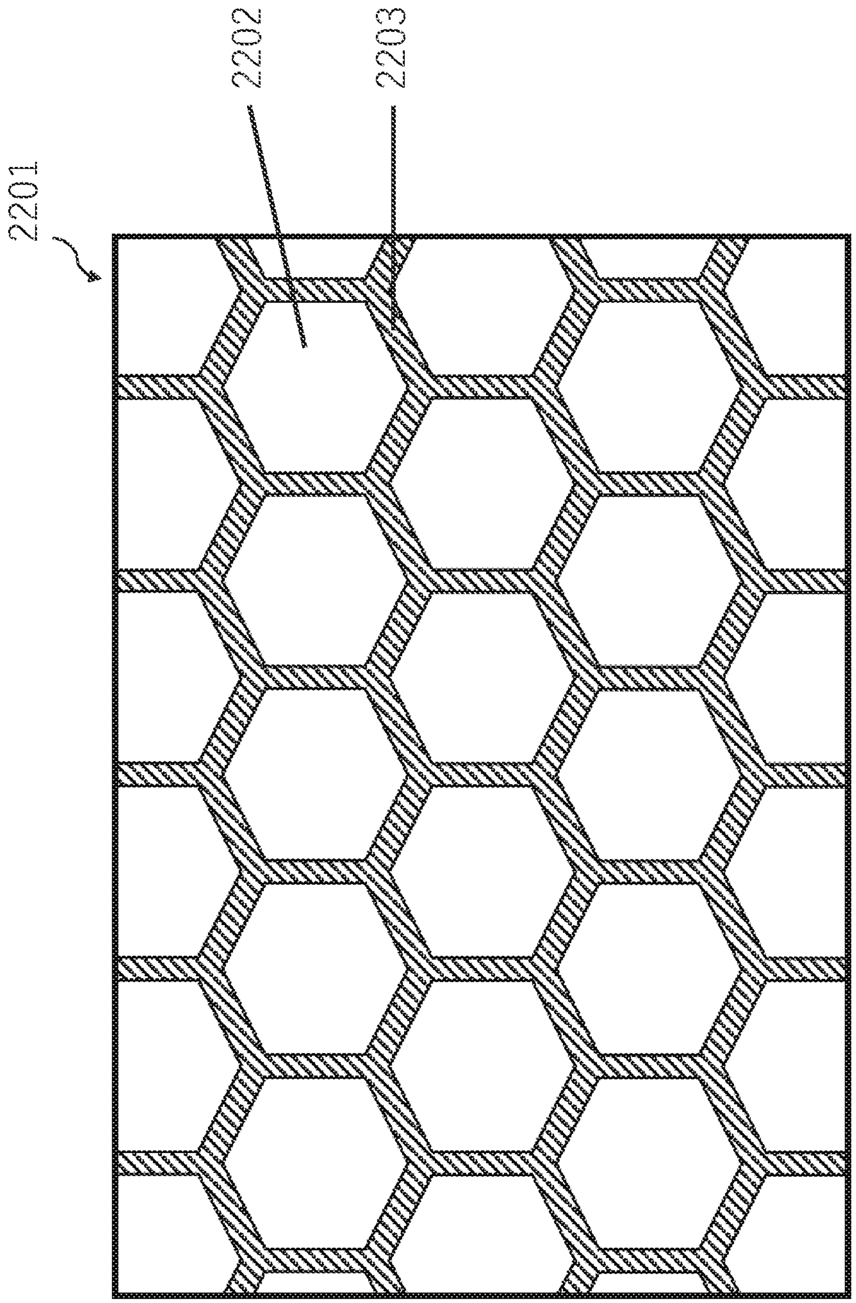
FIG. 22 is a diagram showing an example of the shape of the open cushion used in the sound reproduction device according to the ninth embodiment.
Figure 23:
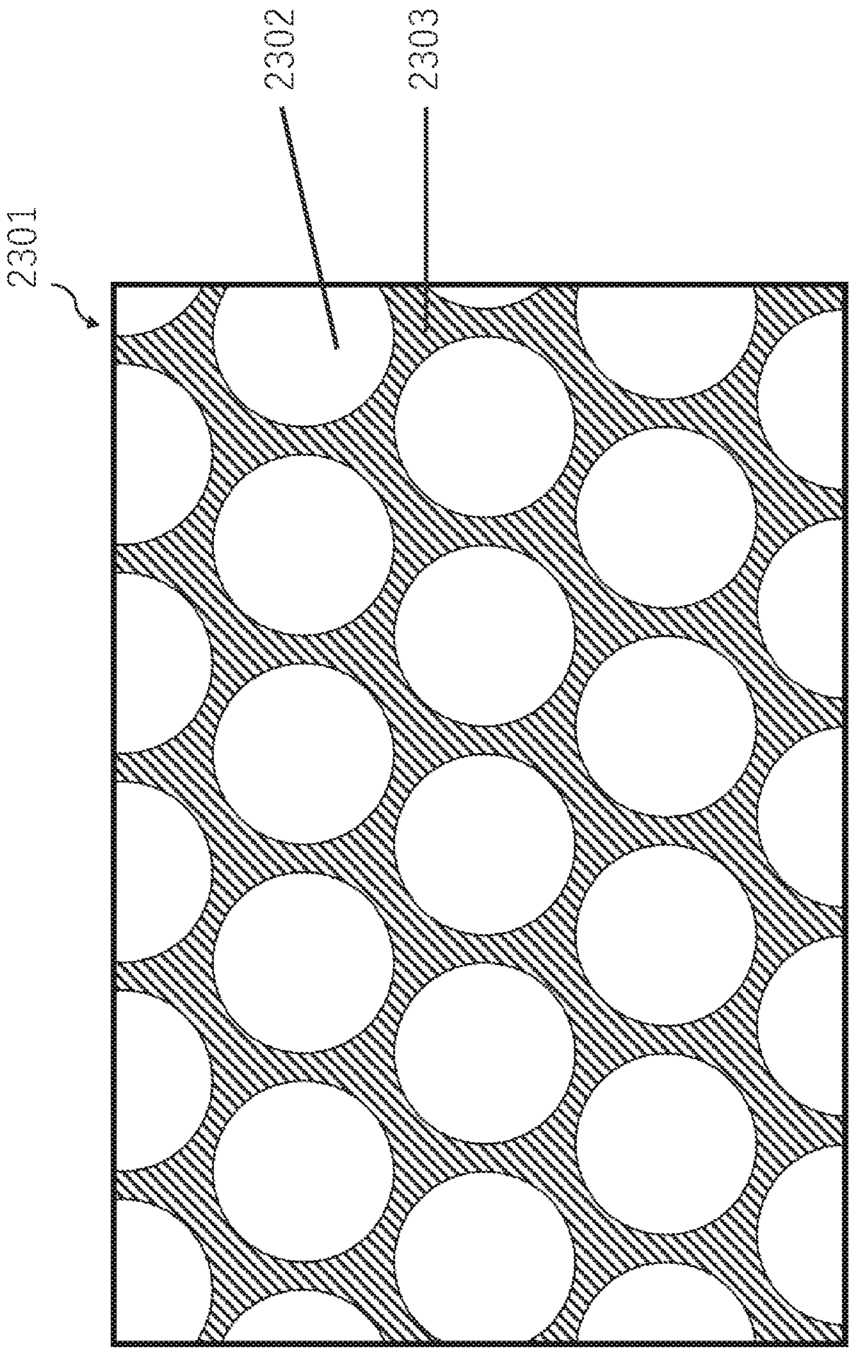
FIG. 23 is a diagram showing another example of the shape of the open cushion used in the sound reproduction device according to the ninth embodiment.

FIG. 22 and FIG. 23 show examples of a shape of the open cushions 1902L and 1902R.

As shown in FIG. 22, the open cushion 2201 includes a solid portion 2202 made of an elastic material. An opening 2203 is formed on the solid portion 2202. The opening 2203 has a hexagonal shape. By configuring such a shape, it is possible to ensure high elasticity and a high opening ratio while using a thin cushion.

As shown in FIG. 23, the open cushion 2301 includes a solid portion 2302 made of an elastic material. An opening 2303 is formed on the solid portion 2302. The opening 2303 has a round shape. By configuring such a shape, it is possible to maintain high elasticity and a high opening ratio while increasing productivity.

Note that the present disclosure is not limited to the shapes of the open cushion shown in FIGS. 19, 22, and 23, and as the open cushion, a three-dimensional network elastic cushion (for example, BREATHAIR manufactured by Toyobo Co., Ltd.) formed of three-dimensionally intertwined fibers may be used. By configuring such a shape, it is possible to ensure an air flow path for the sound absorbing structures 302L and 302R even for sound in directions other than a direction perpendicular to the sound absorbing surface while maintaining cushioning properties.

Tenth Embodiment

Figure 24:
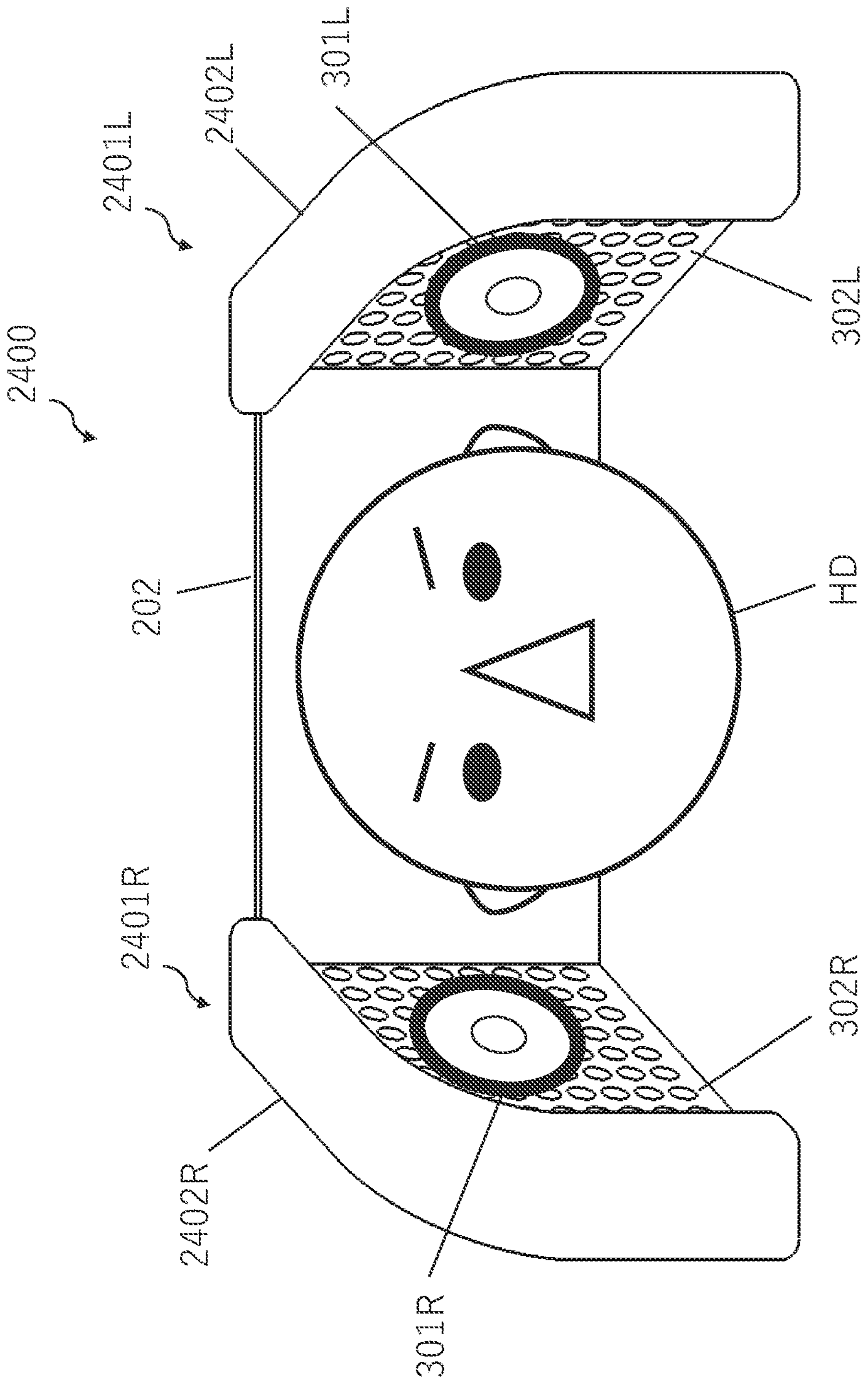
FIG. 24 is a front view of a headrest portion and a surrounding thereof of a sound reproduction device according to a tenth embodiment, and a passenger, which shows an example in which a cushion is disposed partly around a partition portion.

A sound reproduction device 2400 according to a tenth embodiment will be described with reference to FIGS. 24 and 25. Note that the same reference numerals are given to the same configurations as those of the sound reproduction device 200 according to the first embodiment, and description thereof will be omitted. The sound reproduction device 2400 may have at least one configuration of the first to ninth embodiments.

The sound reproduction device 2400 includes cushions 2402L and 2402R (an example of a second cushion) disposed partly around partition portions 2401L and 2401R. The cushions 2402L and 2402R are configured to support the head HD of the passenger.

Figure 25:
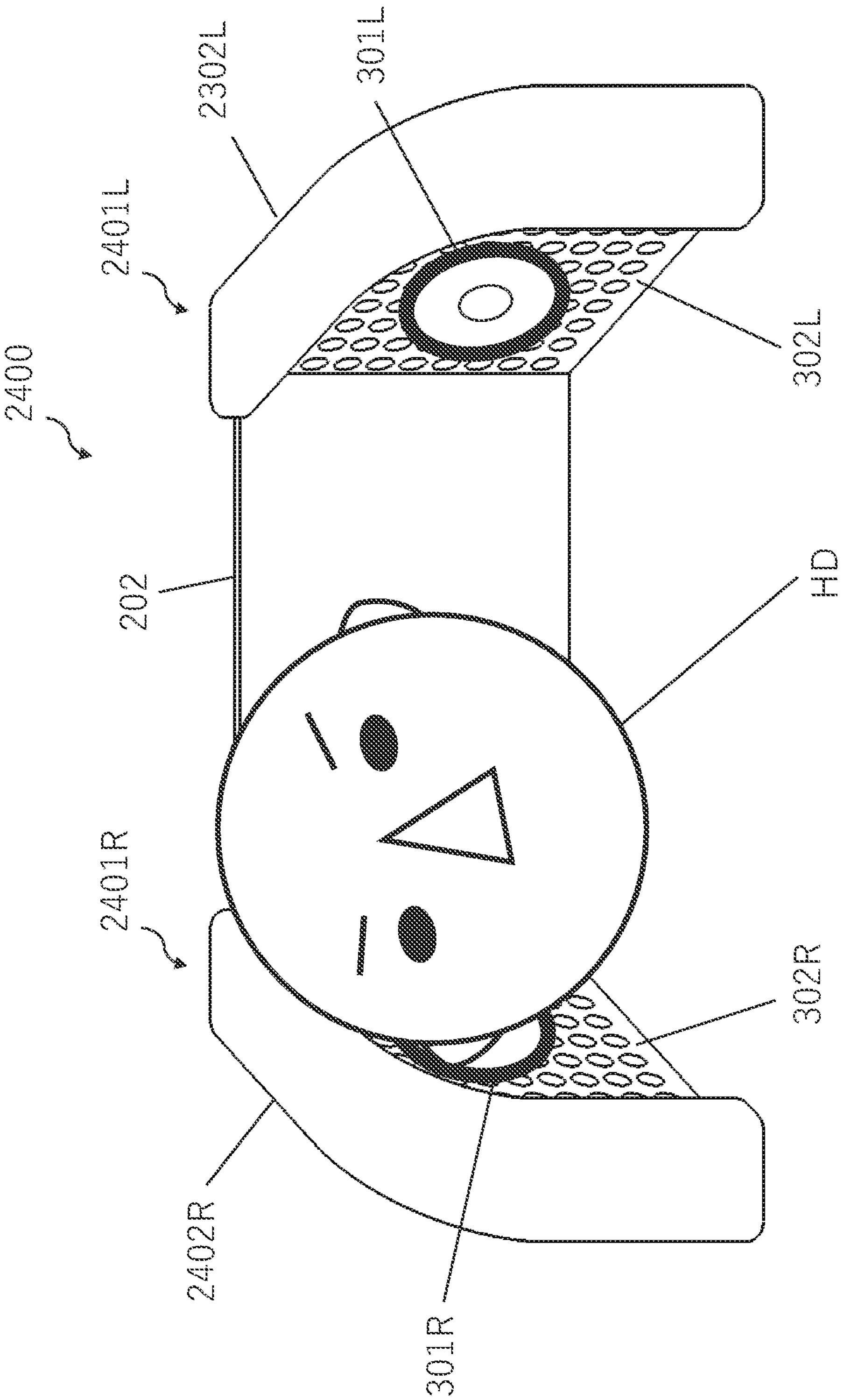
FIG. 25 is a front view of the headrest portion and the surrounding thereof of the sound reproduction device according to the tenth embodiment, and the passenger, which shows a state in which the head of the passenger is supported by the cushion when the head of the passenger leans against the partition portion.

As shown in FIG. 25, when the head HD of the passenger leans against the partition portion 2401R, the head HD of the passenger is supported by the cushion 2402R. In this case, by supporting a part of the head HD with the cushion 2402R, a certain distance can be maintained between the head HD of the passenger and the speaker 301R or the sound absorbing structure 302R without coming into contact with each other.

Note that the cushions 2401L and 2401R may be provided all around the partition portions 2401L and 2401R, or may be provided around a part thereof. By forming the portions of the cushions 2402L and 2402R that support the head HD of the passenger into curved surfaces, the head HD of the passenger can be supported more stably.

Eleventh Embodiment

Figure 26B:
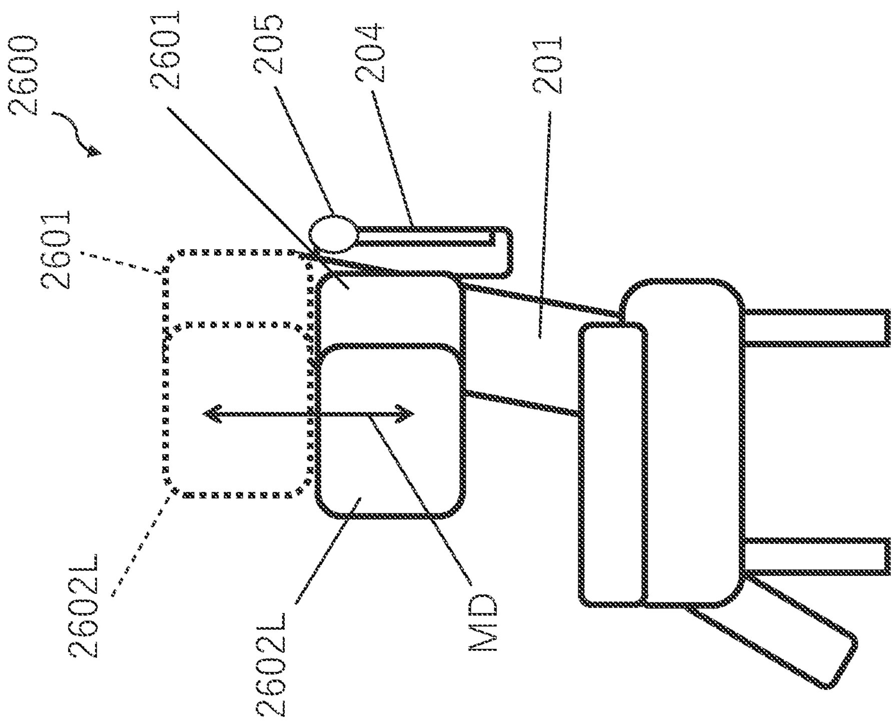
FIG. 26B is a left side view of the aircraft seat on which the sound reproduction device according to the eleventh embodiment is mounted.
Figure 26A:
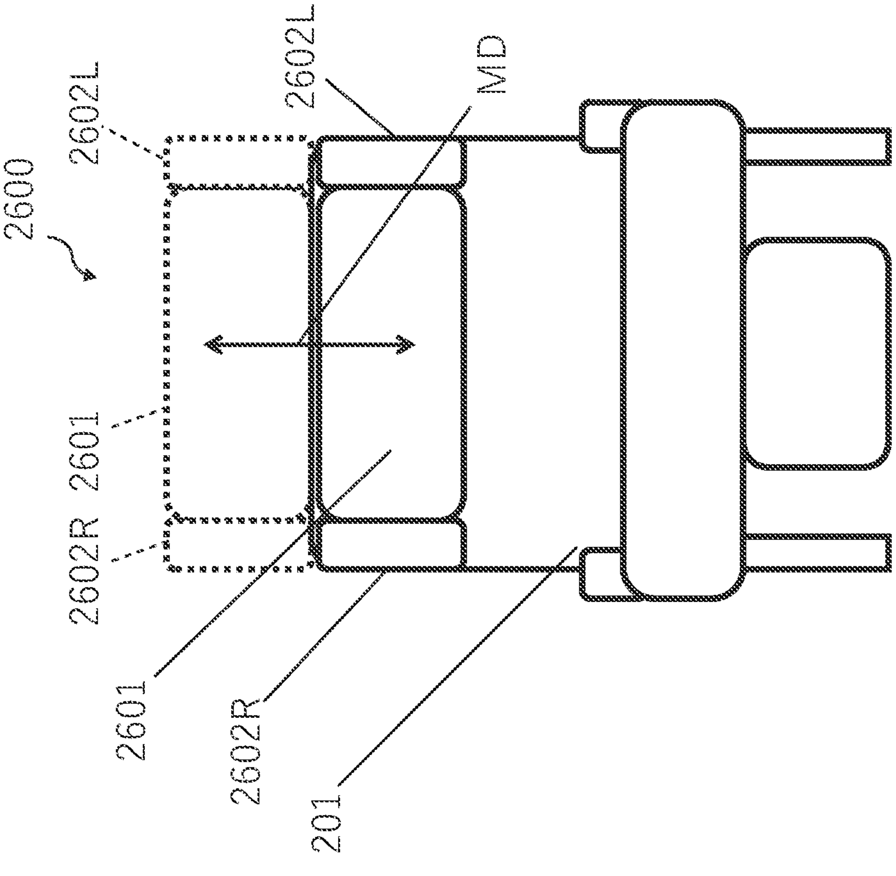
FIG. 26A is a front view of an aircraft seat on which a sound reproduction device according to an eleventh embodiment is mounted, which shows an example in which a headrest portion and a partition portion are configured to be movable.

A sound reproduction device 2600 according to an eleventh embodiment will be described with reference to FIGS. 26A and 26B. Note that the same reference numerals are given to the same configurations as those of the sound reproduction devices 200 and 2400 according to the first embodiment and the tenth embodiment, and description thereof will be omitted. The sound reproduction device 2600 may have at least one configuration of the first to tenth embodiments.

The sound reproduction device 2600 includes a headrest portion 2601 and partition portions 2602L and 2602R that are movable with respect to the aircraft seat 201.

The headrest portion 2601 and the partition portions 2602L and 2602R are, for example, vertically movable. By moving the headrest portion 2601 and the partition portions 2602L and 2602R based on the position of the head of the passenger, the speakers 301L, 301R, the sound absorbing structures 302L, 302R, and the cushions 2402L, 2402R can more effectively exhibit functions thereof.

Other Embodiments

As described above, the above embodiments are described as examples of the technique in the present disclosure, but the present invention is not limited thereto, and can also be applied to embodiments in which changes, replacements, additions, omissions, and the like are made. It is also possible to combine the constituent elements described in the above embodiments to obtain a new embodiment.

What is claimed is:

1. A sound reproduction device configured to store a head of a user and reproduce sound, the sound reproduction device comprising:

a headrest portion comprising a front surface;

a partition portion comprising an inner surface, the partition portion being attached to the headrest portion so as to protrude forward relative to the front surface of the headrest portion such that a storing space capable of storing the head of the user is defined by the inner surface and at least a part of the front surface of the headrest portion;

a microphone provided in the partition portion;

at least one speaker comprising an output surface configured to allow sound to be output therefrom, the at least one speaker being disposed in the partition portion such that the output surface is directed toward the storing space;

a sound absorbing structure provided in at least a part of the inner surface of the partition portion, the part of the inner surface of the partition portion excluding a region corresponding to the output surface of the at least one speaker;

a processor; and a memory storing instructions that, when executed by the processor, cause the sound reproduction device to perform operations, the operations comprising:

acquiring sound data;

acquiring, from the microphone, an environmental sound signal of environmental sound around the microphone;

generating a reproduced sound signal to be output to the at least one speaker based on the sound data;

controlling the reproduced sound signal based on the environmental sound signal;

acquiring a calculated reproduced sound signal by calculating a data signal of sound from the at least one speaker at a position of the microphone, based on: a transfer characteristic between the at least one speaker and the microphone; and the reproduced sound signal;

acquiring a noise sound signal based on the environmental sound signal and the calculated reproduced sound signal; and acquiring an estimated sound signal by estimating sound leaking from the storing space based on a comparison between the calculated reproduced sound signal and the noise sound signal.

2. The sound reproduction device according to claim 1, wherein the partition portion further comprises a head detection sensor disposed between the output surface of the at least one speaker and the headrest portion, and wherein the operations further comprise:

determining whether the head of the user is present in the storing space based on a detection result of the head detection sensor; and controlling the reproduced sound signal based on a determination result of presence or absence of the head of the user.

3. The sound reproduction device according to claim 2, wherein the operations further comprise:

stopping output of the reproduced sound signal in response to a determination that the head of the user is not present in the storing space.

4. The sound reproduction device according to claim 3, wherein the stopping output of the reproduced sound signal comprises stopping output of the reproduced sound signal in response to a determination that the head of the user is not present in the storing space for a given period of time.

5. The sound reproduction device according to claim 3, further comprising:

an information display device, wherein the operations further comprise:

generating display information indicating stop of reproduced sound in response to the stopping output of the reproduced sound signal; and outputting the display information to the information display device.

6. The sound reproduction device according to claim 3, wherein the operations further comprise:

restarting output of the reproduced sound signal in response to a determination that a state of the head of the user is changed from being not present in the storing space to being present in the storing space.

7. The sound reproduction device according to claim 2, wherein the at least one speaker comprises a plurality of speakers, and wherein the operations further comprise:

determining a position of the head of the user in the storing space based on a detection result of the head detection sensor; and adjusting a volume of each of the plurality of speakers based on the position of the head.

8. The sound reproduction device according to claim 1, wherein the microphone is provided on an upper surface of the partition portion or on an outer surface of the partition portion, the outer surface being opposite to the inner surface.

9. The sound reproduction device according to claim 1, wherein the operations further comprise:

filtering a frequency band of the sound leaking from the storing space based on a characteristic of the estimated sound signal.

10. The sound reproduction device according to claim 1, wherein the partition portion is attached to the headrest portion such that at least one of an angle and a position of the partition portion with respect to the headrest portion is adjustable.

11. The sound reproduction device according to claim 10, wherein the at least one speaker is attached to the partition portion such that at least one of an angle and a position of the at least one speaker with respect to the partition portion is adjustable.

12. The sound reproduction device according to claim 1, wherein the partition portion is attachable to and detachable from the headrest portion.

13. The sound reproduction device according to claim 1, wherein the at least one speaker comprises a plurality of speaker elements arranged in an array, and wherein the operations further comprise controlling a phase of a reproduced sound signal for each of the plurality of speaker elements.

14. The sound reproduction device according to claim 1, further comprising:

an acoustic lens disposed on the output surface of the at least one speaker, wherein sound output from the speaker through the acoustic lens is directed to a specific angle.

15. The sound reproduction device according to claim 1, further comprising:

a first cushion provided on the inner surface of the partition portion so as to cover the sound absorbing structure entirely, the first cushion having a plurality of openings.

16. The sound reproduction device according to claim 15, wherein each of the plurality of openings in the first cushion has a hexagonal shape or a round shape.

17. The sound reproduction device according to claim 1, further comprising:

a second cushion provided on the partition portion so as to protrude from the inner surface of the partition portion toward the storing space.

18. The sound reproduction device according to claim 1, wherein the headrest portion and the partition portion are provided on an aircraft seat.

* * * * *